US008649388B2

(12) United States Patent
Evans et al.

(10) Patent No.: US 8,649,388 B2
(45) Date of Patent: Feb. 11, 2014

(54) TRANSMISSION OF MULTIPROTOCOL DATA IN A DISTRIBUTED ANTENNA SYSTEM

(75) Inventors: Allan M. Evans, Cupertino, CA (US); Albert W. Wegener, Portola Valley, CA (US)

(73) Assignee: Integrated Device Technology, inc., San Jose, CA (US)

(\*) Notice: Subject to any disclaimer, the term of this patent is extended or adjusted under 35 U.S.C. 154(b) by 821 days.

(21) Appl. No.: 12/874,910

(22) Filed: Sep. 2, 2010

(65) Prior Publication Data

US 2012/0057572 A1 Mar. 8, 2012

(51) Int. Cl.
*H04L 12/28* (2006.01)
*H04L 12/66* (2006.01)

(52) U.S. Cl.
USPC .................. 370/401; 370/353; 370/395.5

(58) Field of Classification Search
None
See application file for complete search history.

(56) References Cited

U.S. PATENT DOCUMENTS

| | | | |
|---|---|---|---|
| 5,999,561 A * | 12/1999 | Naden et al. | 375/142 |
| 6,192,259 B1 | 2/2001 | Hayashi | |
| 6,263,503 B1 | 7/2001 | Margulis | |
| 6,449,596 B1 | 9/2002 | Ejima | |
| 6,842,623 B2 | 1/2005 | Koscal | |
| 7,009,533 B1 | 3/2006 | Wegener | |
| 7,088,276 B1 | 8/2006 | Wegener | |
| 7,142,519 B2 | 11/2006 | Saadeh et al. | |
| 7,623,894 B2 | 11/2009 | Vaglica et al. | |
| 7,680,149 B2 | 3/2010 | Liu et al. | |
| 7,706,477 B2 | 4/2010 | Larsson | |
| 7,835,435 B2 | 11/2010 | Soni et al. | |
| 7,852,797 B2 | 12/2010 | Kang et al. | |
| 7,899,410 B2 | 3/2011 | Rakshani et al. | |
| 7,961,807 B2 | 6/2011 | Kotecha et al. | |

(Continued)

FOREIGN PATENT DOCUMENTS

| | | |
|---|---|---|
| KR | 2008056360 | 6/2008 |
| WO | 2005062494 | 7/2005 |

(Continued)

OTHER PUBLICATIONS

International Preliminary Report on Patentability, mailed on Mar. 14 2013, for application PCT/US2011/050375.

(Continued)

*Primary Examiner* — Faruk Hamza
*Assistant Examiner* — Andrew Oh
(74) *Attorney, Agent, or Firm* — Haynes Beffel & Wolfeld LLP; Mark A. Haynes

(57) ABSTRACT

In a distributed antenna system (DAS) and a local area network (LAN), a common communication infrastructure distributes data from radio-based and Internet-based sources. A radio equipment (RE) of the DAS interfaces to a LAN segment. For the downlink, a gateway maps radio signal data from a radio equipment controller (REC) and data packets from a switch to mixed-data frames using a radio data interface protocol for transmission in the DAS. At the RE, the signal data and data packets are retrieved from the mixed-data frames and provided to the air interface and LAN segment, respectively. For the uplink from the RE, the radio signal data from the air interface and the data packets from the LAN segment are mapped to mixed-data frames and transmitted to the gateway. The gateway retrieves the signal samples and data packets from the mixed-data frames for transfer to the REC and switch, respectively.

66 Claims, 26 Drawing Sheets

(56) References Cited

U.S. PATENT DOCUMENTS

| | | | |
|---|---|---|---|
| 8,005,152 | B2 | 8/2011 | Wegener |
| 8,089,854 | B2 | 1/2012 | Persico |
| 8,174,428 | B2 | 5/2012 | Wegener |
| 8,254,987 | B2 * | 8/2012 | Kabashima et al. ........ 455/552.1 |
| 8,400,965 | B2 * | 3/2013 | Aoyama et al. ............... 370/328 |
| 2002/0055371 | A1 | 5/2002 | Arnon et al. |
| 2003/0100286 | A1 * | 5/2003 | Severson et al. .............. 455/324 |
| 2004/0062392 | A1 | 4/2004 | Morton |
| 2004/0082365 | A1 | 4/2004 | Sabach et al. |
| 2005/0104753 | A1 | 5/2005 | Dror et al. |
| 2005/0105534 | A1 * | 5/2005 | Osterling ................. 370/395.43 |
| 2005/0105552 | A1 * | 5/2005 | Osterling ...................... 370/466 |
| 2005/0286507 | A1 * | 12/2005 | Sterling et al. ............... 370/363 |
| 2006/0159070 | A1 | 7/2006 | Deng |
| 2007/0054621 | A1 | 3/2007 | Larsson |
| 2007/0091896 | A1 * | 4/2007 | Liu ............................ 370/395.5 |
| 2007/0116046 | A1 | 5/2007 | Liu et al. |
| 2007/0149135 | A1 | 6/2007 | Larsson et al. |
| 2007/0165575 | A1 * | 7/2007 | Niwano ........................ 370/335 |
| 2007/0171866 | A1 * | 7/2007 | Merz et al. .................... 370/330 |
| 2008/0018502 | A1 | 1/2008 | Wegener |
| 2008/0225816 | A1 * | 9/2008 | Osterling et al. ............. 370/342 |
| 2009/0239477 | A1 * | 9/2009 | Yamamoto ...................... 455/68 |
| 2009/0252206 | A1 * | 10/2009 | Rheinfelder et al. ......... 375/219 |
| 2009/0265744 | A1 | 10/2009 | Singh et al. |
| 2009/0290632 | A1 | 11/2009 | Wegener |
| 2009/0291681 | A1 * | 11/2009 | Hara ........................... 455/422.1 |
| 2010/0016013 | A1 * | 1/2010 | Kabashima et al. ........ 455/552.1 |
| 2010/0136932 | A1 * | 6/2010 | Osterling et al. ........... 455/115.1 |
| 2010/0177690 | A1 | 7/2010 | Okeeffe et al. |
| 2010/0202311 | A1 | 8/2010 | Lunttila et al. |
| 2011/0135013 | A1 | 6/2011 | Wegener |
| 2011/0280209 | A1 | 11/2011 | Wegener |
| 2011/0317550 | A1 * | 12/2011 | Tanigawa et al. ............. 370/225 |
| 2012/0008696 | A1 | 1/2012 | Wegener |
| 2012/0014421 | A1 | 1/2012 | Wegener |
| 2012/0014422 | A1 | 1/2012 | Wegener |

FOREIGN PATENT DOCUMENTS

| | | |
|---|---|---|
| WO | 2008152455 | 12/2008 |
| WO | 2009143176 | 11/2009 |
| WO | 2009/151893 | 12/2009 |
| WO | 2009151893 | 12/2009 |

OTHER PUBLICATIONS

"OBSAI Open Base Station Architecture Initiative BTS System Reference Document," Version 2.0, 2006, 151 pages.
"OBSAI Open Base Station Architecture Initiative Reference Point 3 Specification," Version 4.0, 2007, 119 pages.
CPRI Specification V2.0, Common Public Radio Interface (CPRI); Interface Specification, Oct. 1, 2004, 75 pages.
CPRI Specification V4.1, Common Public Radio Interface (CPRI); Interface Specification, Feb. 18, 2009, 109 pages.
International Search Report and Written Opinion, issued on Apr. 23 2012, for application PCT/US2011/050375.
International Preliminary Report on Patentability, issued on Nov. 23, 2010, for application PCT/US2009044553.
International Preliminary Report on Patentability, issued on Nov. 23, 2010, for application PCT/US2009044551.
CPRI Specification V3.0 Common Public Radio Interface (CPRI); Interface Specification, Oct. 2, 2006, 89 pages, Ericsson Ab, huawei Technologies Col Ltd, NEC Corporation, Nortel Networks SA and Siemens networks BmbH & Co. KG.
K. I. Pendersen. "Frequency domain scheduling for OFMA with limited and noisy channel feedback" 2007 IEEE 66th Vehicular Technology Conference. pp. 1792-1796, Oct. 3, 2007. see section II. C.
Maruyama, S. et al., "Base Transceiver Station for W-CDMA System," Fujitsu Sci. Tech. J. 38,2, p. 167-173, Dec. 2002.
International Search Report and Written Opinion, issued on May 30, 2012, for application PCT/US2012/020359.
International Search Report and Written Opinion, issued on Apr. 23, 2012, for application PCT/US2011/050375.

* cited by examiner

TRANSMISSION OF MULTIPROTOCOL DATA IN A DISTRIBUTED ANTENNA SYSTEM

BACKGROUND OF THE INVENTION

The present invention relates to data transmission in a distributed antenna system (DAS) in proximity with a local area network (LAN), wherein a radio data interface protocol is applied to the data having multiple data protocols for transfer over the transmission infrastructure of the DAS.

Transceiver systems in wireless communication networks perform the control functions for directing signals among communicating subscribers, or terminals, as well as communication with external networks. The general operations of a radio transceiver system include receiving radio frequency (RF) signals, converting them to signal data, performing various control and signal processing operations on the signal data, converting the signal data to an RF signal and transmitting the RF signal to the wireless subscriber. Transceiver systems in wireless communications networks include radio base stations and distributed antenna systems (DAS). For the reverse link, or uplink, a terminal transmits the RF signal received by the transceiver system. For the forward link, or downlink, the transceiver system transmits the RF signal to a subscriber, or terminal, in the wireless network. A terminal may be fixed or mobile wireless user equipment unit (UE) and may be a wireless device, cellular phone, personal digital assistant (PDA), personal computer or other device equipped with a wireless modem.

Transceiver systems in wireless communication networks must manage the increasing amounts of data required for offering new services to an expanding subscriber base. System design challenges include ensuring flexibility for evolving standards, supporting growing data processing requirements and reducing overall cost. The modular design approach for radio base stations and distributed antenna systems provides the flexibility to meet these challenges. The components of modular designs include base station processors, or radio equipment controllers (RECs) and RF units, or radio equipments (RE), coupled by serial data links, using copper wire or fiber optic cabling. The REs include transmitters, receivers, analog to digital converters (ADCs) and digital to analog converter (DACs). Wire or fiber optic serial data links transfer the sampled signals between the REs and the REC of the radio base station system. The sampled signals may be centered at the RF or converted to an intermediate frequency (IF) or baseband prior to transfer over the data link. The REC includes functions for signal processing, control and communication with external networks.

In a typical wireless communication network, wireless user equipment units (UEs) communicate via a radio access network (RAN) to one or more core networks. The RAN covers a geographical area which is divided into cell areas, with each cell area being served by a radio base station. A cell is a geographical area where radio coverage is provided by the radio equipment (RE) at a base station site. Each cell is identified by a unique identity, which is broadcast in the cell. The RE communicates over the air interface with the UEs within range of the base station. In the radio access network, several base stations are typically connected (e.g., by landlines or microwave) to a control node known as a base station controller (BSC) or radio network controller (RNC). The control node supervises and coordinates various activities of the plural radio base stations connected to it. The RNCs are typically connected to one or more core networks. One example of a radio access network is the Universal Mobile Telecommunications (UMTS) Terrestrial Radio Access Network (UTRAN). The UTRAN radio access network uses wideband code division multiple access (WCDMA) for communication with the UEs.

The modular design approach for radio transceiver systems has led the industry to develop interface standards. One example of an internal interface of a transceiver system which links the radio equipment to a radio equipment control controller is the Common Public Radio Interface (CPRI). The Common Public Radio Interface Specification Version 4.1 (2009 Feb. 18) and previous versions, referred to herein as "CPRI specification," define a publicly available specification for the data transfer interfaces between the radio equipment (RE) and radio equipment controllers (REC) of transceiver systems, including base stations and distributed antenna systems (DAS). The radio equipment control (REC) processes baseband signal data and communicates with the RNC via an interface referred to as "Iub" for UMTS. The radio equipment (RE) performs the RF processing for transmission of signals over the antenna to UEs, referred to as "Uu" for the UMTS air interface. The REC and RE correspond to the base station processor and the RF unit, respectively. The CPRI specification defines protocols for the serial interface and operations at the physical layer (Layer 1) and the data link layer (Layer 2). Layer 1 and Layer 2 are two of seven categories in the hierarchy of communications functions defined for the "Open System Interconnection (OSI)" network architecture developed by the International Organization for Standardization (ISO), referred to as the ISO-OSI network architecture. The serial data link between REC and RE or between two REs, is a bidirectional interface with one transmission line per direction. Connection topologies between the REC and one or more REs include point-to-point, multiple point-to-point, chain, star, tree, ring and combinations thereof.

The CPRI specification supports cellular radio standards 3GPP UTRA FDD, Release 8 (December 2008) and 3GPP E-UTRA, Release 8 (December 2008). The CPRI specification also supports the wireless networking protocol Worldwide Interoperability for Microwave Access, known as WiMax (IEEE 802.16-2004 and IEEE 802.16e-2005). For WiMax, the REC provides access to network entities, such as other WiMax base stations or a WiMax Access Service Network Gateway (ASN-GW). The RE provides the air interface to the subscriber station or mobile subscriber station.

Another example of an interface specification for modular architecture of radio transceiver systems is the Open Base Station Architecture Initiative (OBSAI). The OBSAI specification describes alternative protocols for the interconnection of RF modules, analogous to RE of the CPRI specification, and baseband modules, analogous to REC of the CPRI specification, as well as data transfer protocols for the serial data links. The OBSAI standard supports several wireless modulation formats, including GSM/EDGE, WCDMA, CDMA and WiMax. The OBSAI standard can also accommodate other wireless network configurations or signal modulation formats by incorporating general purpose modules. The OBSAI standard is described in the documents, "OBSAI Open Base Station Architecture Initiative BTS System Reference Document," Version 2.0, 2006, and "OBSAI Open Base Station Architecture Initiative Reference Point 3 Specification," Version 4.0, 2007.

A distributed antenna system (DAS) distributes signal data from a main antenna or radio data resource to multiple remote antennas connected via Cat5 cable, coaxial cable or fiber optic links. A DAS can connect to a variety of wireless services and then rebroadcast those signals throughout the areas in which the DAS is installed. For example, a DAS can improve cellular telephone coverage within a large building or other structure. A main transceiver and antenna positioned on the roof of the building is connected by cable or fiber to multiples distributed antennas within the building. A DAS may include a "head end" into which source signals are combined for distribution to remote radio units. A DAS system may provide coverage in confined spaces, such as high rise buildings, tunnels, railways and airports. As defined by the DAS Forum of the Personal Communications Industry Association (PCIA), a DAS is a network of spatially separated antenna nodes connected to a common source via a transport medium that provides wireless communication service within a geographic area or structure. The DAS antenna elevations are generally at or below the clutter level and node installations are compact. A digital serial data link may connect the head end to the remote radio units, or heads.

Communication infrastructure within a building or structure may include physically distinct networks that support different services. For example, the communications infrastructure for a large building may include a DAS for providing cellular telephone service to UE devices on the premises and an Ethernet-based local area network (LAN) for providing Internet service to user terminals in the building. The DAS for the building may include a head end REC that interfaces with the RAN and one or more REs distributed at locations in the structure for communication over the air interface with UE devices. The building's LAN may include an Ethernet switch connected to the Internet and distributing the data packets to the user terminals via the Ethernet media system, such as the Gigabit Ethernet (GbE) twisted-pair 1000BASE-T.

Using a common distribution infrastructure for data from both the radio access network and from other sources, such as the Internet, can provide savings in both the communication infrastructure installation and maintenance. The LAN infrastructures commonly use the protocols for Ethernet data link layer (Layer 2) and physical layer (Layer 1) described in the IEEE 802.3 Standard. The DAS may use the CPRI protocol or other radio data protocol to distribute radio packets between the head end REC and the REs distributed in the building or structure. Mapping the Ethernet frames to the CPRI radio data framing protocol without introducing unacceptable latency to the distribution of data to both wireless devices and to Internet subscribers will allow a single communication infrastructure to support both services within the building or structure. The combined DAS and LAN distribution infrastructure will allow economies in both installation and maintenance of the radio network and Internet network services within the building or structure.

Increasing the data transfer capacity of serial data links allows lower cost links in the DAS. Compression of signal samples prior to transfer over the serial data links improves the capacity of existing data links to transfer increasing traffic, possibly eliminating or at least postponing, the need to upgrade the existing data links. Computationally efficient compression and decompression conserves computing resources. Therefore, there is also a need for compressing signal samples from the radio sources and transferring the compressed samples with the data from the Internet or LAN sources using the radio data transfer protocol of the DAS.

SUMMARY OF THE INVENTION

A general object of the invention is to provide efficient transmission of data having different sources and protocols in a DAS and LAN using a common communication infrastructure.

The present invention provides a method of data distribution in a DAS and LAN that supports downlink communication. For the downlink communication, a REC provides signal samples organized in radio data frames in accordance with a radio data interface protocol and a switch provides data packets organized in accordance with a LAN protocol. The data packets are destined for a corresponding LAN segment coupled to communicate with a corresponding RE. The method includes steps performed at a gateway of receiving the data packets from the switch, receiving the signal samples from the REC, mapping the data bits from the data packets and the signal samples to one or more mixed-data frames having the frame structure in accordance with the radio data interface protocol, and transmitting the mixed-data frame over a data transfer interface to the corresponding RE. At the RE, the method includes steps of receiving the mixed-data frame, retrieving the data bits and the signal samples from the mixed-data frame, formatting the data bits into reconstructed data packets in accordance with the LAN protocol for transmission to the corresponding LAN segment, and providing the signal samples of the corresponding antenna-carrier to the DUC.

The present invention further provides a method of data distribution in a DAS and LAN that supports uplink communication. For the uplink communication, data packets, organized in accordance with the LAN protocol, are transmitted from one or more LAN segments of the LAN to the corresponding RE. The RE applies an analog to digital converter (ADC) to a received analog signal and a digital downconverter (DDC) to produce the signal samples of one or more antenna-carriers. At the RE, the method comprises steps of receiving the data packets from a corresponding LAN segment, mapping the data bits from the data packets and the signal samples output from the DDC to one or more mixed-data frames, the mixed-data frame having a frame structure in accordance with a radio data interface protocol, and transmitting the mixed-data frame over a data transfer interface to the gateway. At the gateway, the method comprises the steps of receiving the mixed-data frame, retrieving the data bits and the signal samples from the mixed-data frame, formatting the data bits into one or more reconstructed data packets in accordance with the LAN protocol for transmission to a switch, and mapping the signal samples to a radio data frame for transfer to a REC.

The present invention further provides an apparatus for data distribution in a DAS and LAN that supports downlink communication. For the downlink communication, a REC provides signal samples organized in radio data frames in accordance with a radio data interface protocol and a switch provides data packets organized in accordance with a LAN protocol. The data packets are destined for a corresponding LAN segment coupled to communicate with a corresponding RE. The apparatus comprises a gateway, including one or more gateway ports to receive the data packets from the Ethernet switch. The gateway receives the signal samples from the REC via a serial data link. The signal samples are organized into one or more radio data frames. The gateway comprises a mixed-data framer that maps the data bits from the data packets and the signal samples for the corresponding RE into one or more mixed-data frames, the mixed-data frames having the frame structure in accordance with the radio data interface protocol. The mixed-data frames are transferred via a data transfer interface to the corresponding RE. At the RE, a mixed-data deframer retrieves the data bits and the signal samples from the mixed-data frame and provides the signal samples to the DUC. Formatting logic formats the data bits into one or more reconstructed data packets for transmission to the corresponding LAN segment.

The present invention further provides an apparatus for data distribution in a DAS and LAN that supports uplink communication. For the uplink communication, the data packets, organized in accordance with the LAN protocol, are transmitted from one or more LAN segments of the LAN to the corresponding RE. The RE applies an ADC to a received analog signal followed by a DDC to produce the signal samples of one or more antenna-carriers. At the RE, the apparatus comprises a mixed-data framer that receives the signal samples output from the DDC and the data bits of the data packets received from the corresponding LAN segment. The mixed-data framer maps the data bits and the signal samples to one or more mixed-data frames having a frame structure in accordance with a radio data interface protocol. The apparatus further comprises a gateway that receives the mixed-data frame from the corresponding RE via a data transfer interface. The gateway comprises a mixed-data deframer that retrieves the data bits and the signal samples from the mixed-data frame, formatting logic that formats the data bits into one or more reconstructed data packets for transmission to a switch, and a radio data framer that maps the signal samples into one or more radio data frames for transfer to a REC.

A gateway is described that is arranged for an addressed packet protocol including packets having destination addresses, such as an Ethernet protocol, and a time division multiplexed container protocol, such as a radio data interface protocol, configured for a communication with an access point such as a radio or radios like those used in RE systems with co-located wireless data networks and wireless cellular telephone networks. The gateway comprises a plurality of data ports, including a first port configured for data communications according to the addressed packet protocol with end stations accessible through the access point, a second port configured for data communications according to the time division multiplexed container protocol and a third port configured for data communications according to the time division multiplexed container protocol between the gateway and the access point; and a processor coupled to the plurality of data ports, including logic to process downlink data packets from the addressed packet protocol carrying destination addresses of end stations accessible through the access point, and downlink containers including groups of signal samples from the time division multiplexed container protocol, and to produce mixed-data communications according to the time division multiplexed container protocol, including a first set of output containers carrying respective parts of the downlink data packets and a second set of output containers carrying respective groups of the signal samples from the downlink containers, and to transmit first and second sets of containers on the third port. Also the gateway can include logic to process mixed-data communications including uplink mixed-data input containers from the time division multiplexed container protocol received on the third port, the mixed-data input containers including sets of input containers carrying parts of uplink data packets from the addressed packet protocol having source addresses from the end stations accessible through the access point, and sets of input containers carrying groups of uplink data samples from the wireless cellular protocol, and to produce data communications according to the addressed packet protocol carrying the uplink data packets and data communications according to the time division multiplexed container protocol carrying groups of the uplink data samples. In advantageous embodiments, the gateway processor includes logic to apply data compression to the signal samples for the second set of output containers.

A radio network access device is also described that is arranged for an addressed packet protocol including packets having destination addresses and a wireless cellular protocol, and that is adapted for use with the gateway described above. The access device that is described comprises a radio or radios including one or more antennas configured for communications according to the addressed packet protocol with end stations accessible through the radio or radios, and for data communications according to wireless cellular protocol; a data port configured for data communications according to a time division multiplexed container protocol; and a processor coupled to the radio or radios and the data port, including logic to process data packets from the addressed packet protocol and an uplink stream of signal samples from wireless cellular protocol, and to produce mixed-data communications according to a time division multiplexed container protocol, including a first set of output containers carrying parts of the uplink data packets and a second set of output containers carrying groups of the uplink signal samples, and to transmit the first and second sets of containers on the data port. The processor of the access device can also include logic coupled to the data port and to the radio or radios, to process mixed-data communications according to a time division multiplexed container protocol received on the data port, including a first set of input containers carrying parts of downlink data packets and a second set of input containers carrying groups of downlink signal samples, and to transmit the addressed data packets for the addressed packet protocol and a stream of signal samples for the cellular protocol to the radio or radios. In advantageous embodiments, the access point processor includes logic to apply data compression to the signal samples for the second set of output containers.

DETAILED DESCRIPTION

Figure 1:
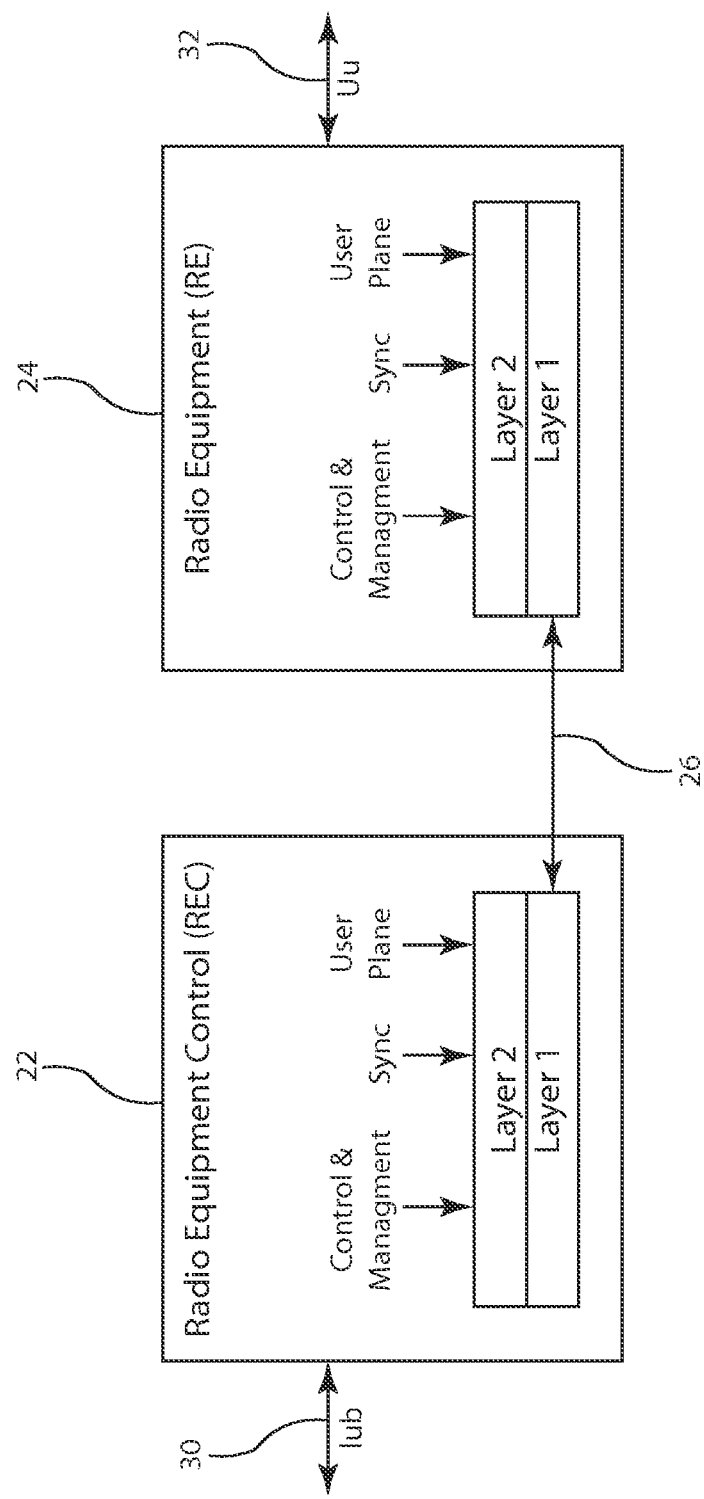
FIG. 1 illustrates communication between REC and RE modules for a DAS or a radio base station.

FIG. 1 illustrates communication between REC and RE modules for a DAS or a radio base station. The REC 22 and RE 24 are connected by a serial data link 26. The Layer 2 and the Layer 1 blocks represent the communication functions between the REC 22 and the RE 24. As in the CPRI specification, the description herein is based on the UMTS (Universal Mobile Telecommunication System) nomenclature. However, the REC 22, RE 24 and the serial data link 26 may operate in accordance with other specifications, such as the above-referenced OBSAI specification or a proprietary specification.

In a DAS, the REC 22 and one or more REs 24 may be physically separated. The REs 24 may be close to the one or more antennas radiating signals to UEs in the building or structure via the Uu interface 32. The REC 22 may be located in a conveniently accessible site. Depending on the interface 30 between the REC and the radio access network (RAN), the REC 22 and one of the REs 24 may be co-located, as in a conventional radio base station design, at the head end of the DAS and additional remote REs 24 installed at remote locations in the building or structure. Alternatively, the interface 30 may connect the REC 22 and a Radio Network Controller (RNC) via the Iub interface for the UMTS radio access network.

The basic functions of the REC 22 may include the Iub transport and protocols, the Node B (base station) control and management, and the digital baseband processing. For the downlink (i.e., from REC 22 to RE 24), the REC 22 handles such operations as channel coding, interleaving, spreading, scrambling, adding of physical channels, controlling transmit power of each physical channel, frame and signal slot generation (including clock stabilization). For the uplink (i.e., from RE 24 to REC 22), the REC 22 handles such operations as channel de-coding, de-interleaving, de-spreading, de-scrambling, signal distribution to signal processing units, detection of feedback information for transmit power control, and signal to interference ratio measurement.

The RE 24 serves the air interface 32 to the user equipment (UE) or mobile devices (not illustrated). In an UMTS network the air interface is called the Uu interface. The RE 24 provides the analog and radio frequency functions such as filtering, modulation, frequency conversion and amplification. For the downlink, the RE 24 performs operations such as digital to analog (D/A) conversion, upconversion, on/off control of each carrier, carrier multiplexing, power amplification and limiting, antenna supervision, and RF filtering. For the uplink, the RE 24 performs operations such as analog to digital (A/D) conversion, downconversion, automatic gain control, carrier de-multiplexing, low noise amplification, and RF filtering. The REC 22 performs the processing functions of the digital baseband domain, whereas the RE 24 performs the A/D and D/A conversion functions and the analog radio frequency functions. For this example, the functional split between the REC 22 and RE 24 allows the transfer of digital baseband samples representing user data via the serial data link 26. The digital baseband samples include in-phase and quadrature (I,Q) samples representing the user data, also referred to as the user plane. In general, the signal samples representing the user data may be real-valued samples or complex-valued (I,Q) samples. The center frequency of the signal samples may be substantially zero (baseband) or an intermediate frequency (IF).

Figure 2:
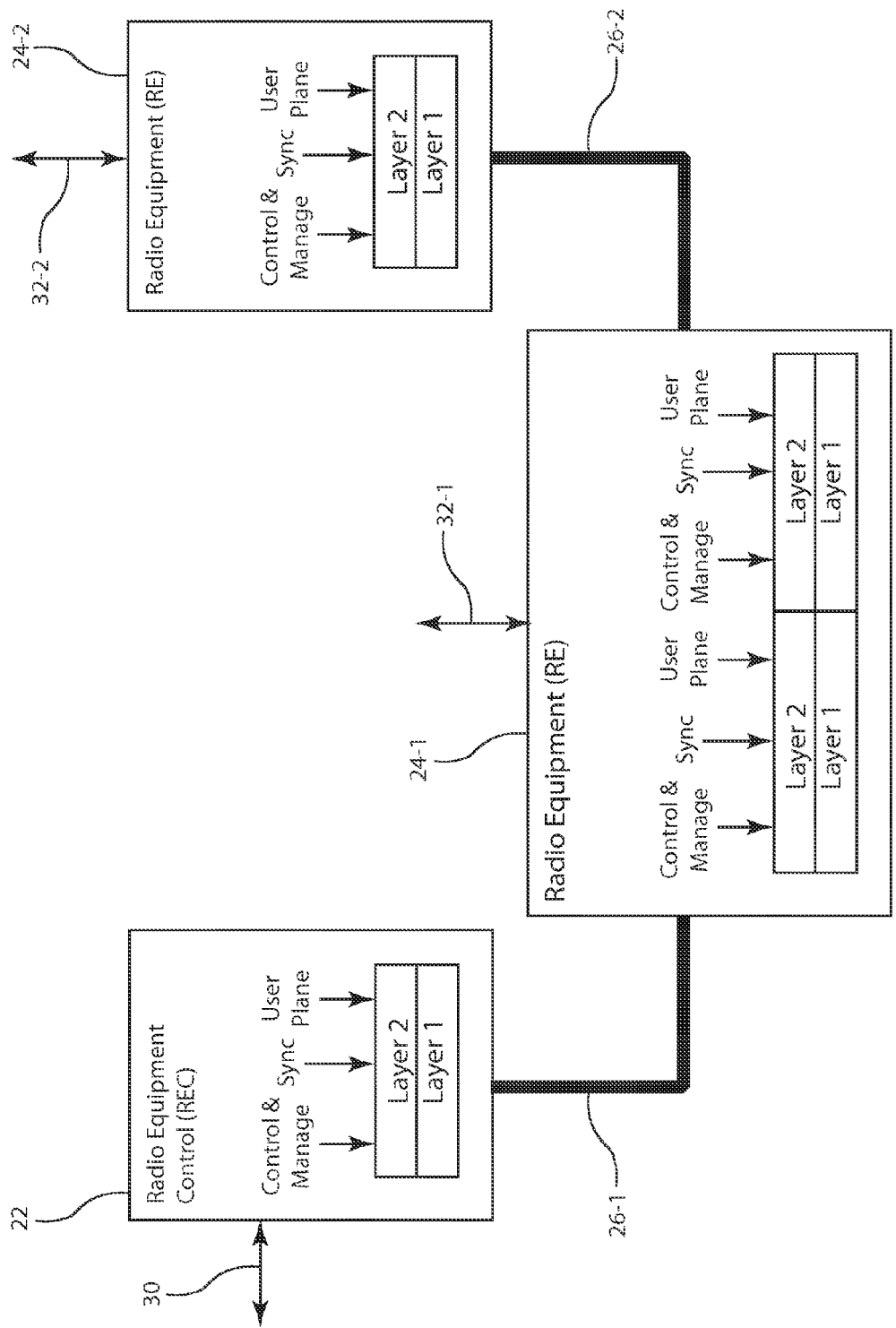
FIG. 2 shows an example configuration having two REs.

FIG. 2 shows an example configuration having two REs 24-1 and 24-2. Both the REs 24-1 and 24-2 each have respective air interfaces 32-1 and 32-2 for communicating with user devices. The serial data links 26-1 and 26-2 connect the intermediate RE 24-1 to the REC 22 and to the second RE 24-2, respectively. The intermediate RE 24-1 is able to relay information between the second RE 24-2 and the REC 22 in addition to transferring user data between the REC 22 and user devices via the air interface 32-1.

Figure 3:
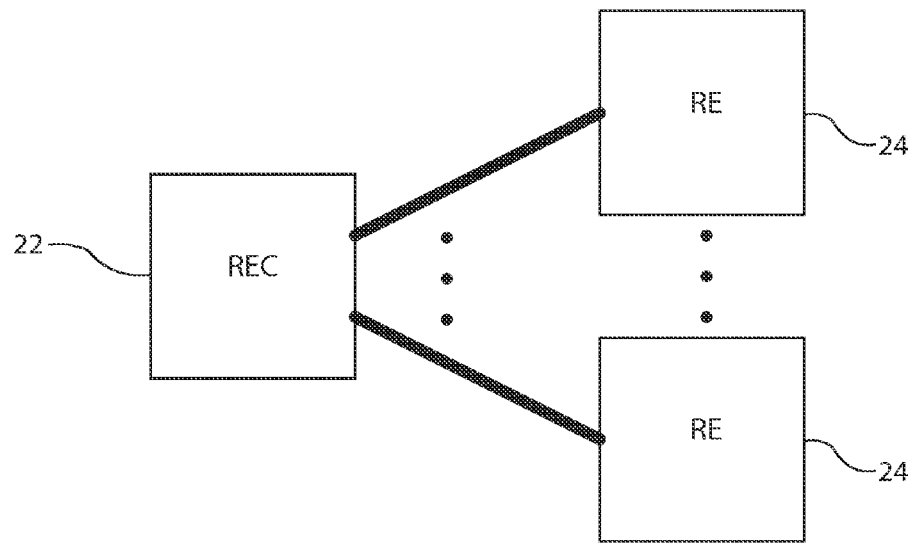
FIG. 3 shows multiple point-to-point links between one REC and several REs in a star topology.
Figure 4:
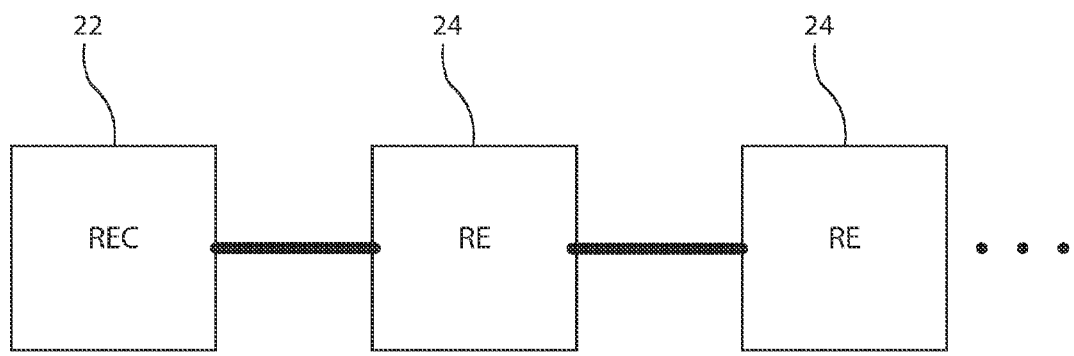
FIG. 4 shows multiple REs connected in series to REC in a chain topology.
Figure 5:
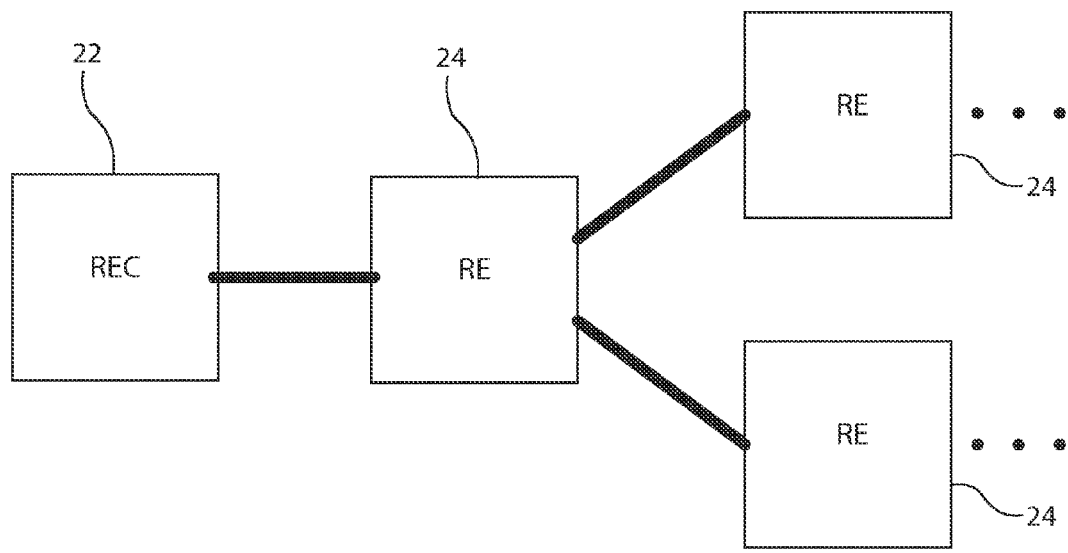
FIG. 5 shows interconnected REs connected to the REC in a tree topology.
Figure 6:
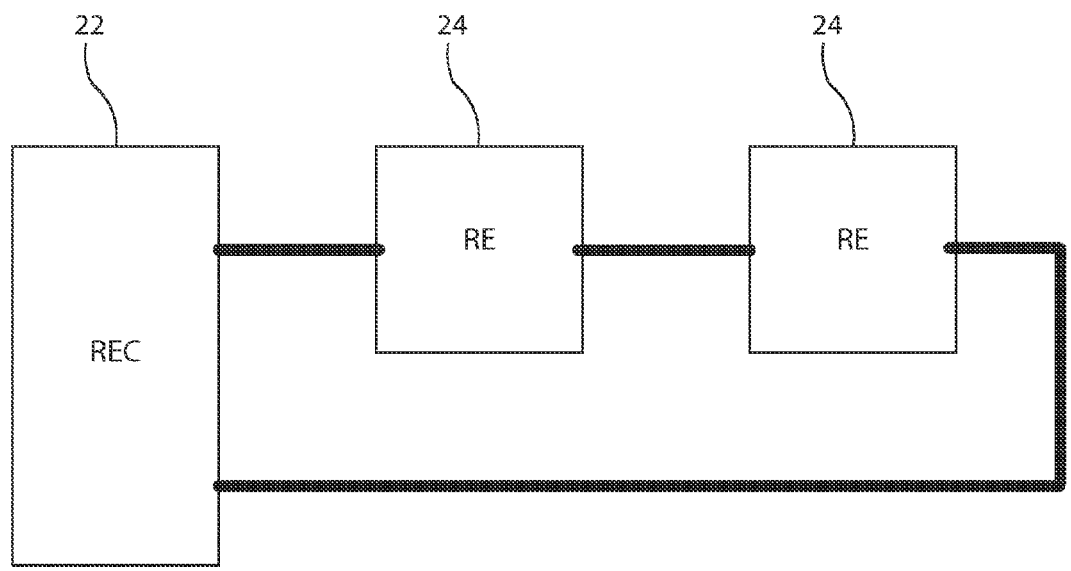
FIG. 6 shows REC and REs connected in a ring topology.

FIG. 3 through FIG. 6 show examples of various topologies for links between RECs and REs in a DAS. FIG. 3 shows multiple point-to-point links between one REC 22 and multiple REs 24 in a star topology. FIG. 4 shows multiple REs 24 connected in series to REC 22 in a chain topology. FIG. 5 shows interconnected REs 24 connected to the REC 22 in a tree topology. FIG. 6 shows REC 22 and REs 24 connected in a ring topology.

The CPRI specification defines protocols for the Layer 1 and the Layer 2 for transfer of the user data, control and management data and synchronization information between the REC 22 and one or more REs 24 and between REs, i.e. RE 24-1 and RE 24-2. Layer 1 specifications include the line transmission bit rates, electrical characteristics, optical characteristics, line coding, time division multiplexing of the different data flows, frame structure and low level signaling. Layer 2 specifications include control and management data, data mapping, media access control, data flow and protection of the control and management data. Generally, the CPRI defined protocols include a time division multiplexed container protocol, which is provisioned to transmit streams of signal samples in a point to point channel, such as between the REC and corresponding antenna-carriers being operated using the RE of the system, and user equipment operating on such antenna-carriers.

Figure 7:
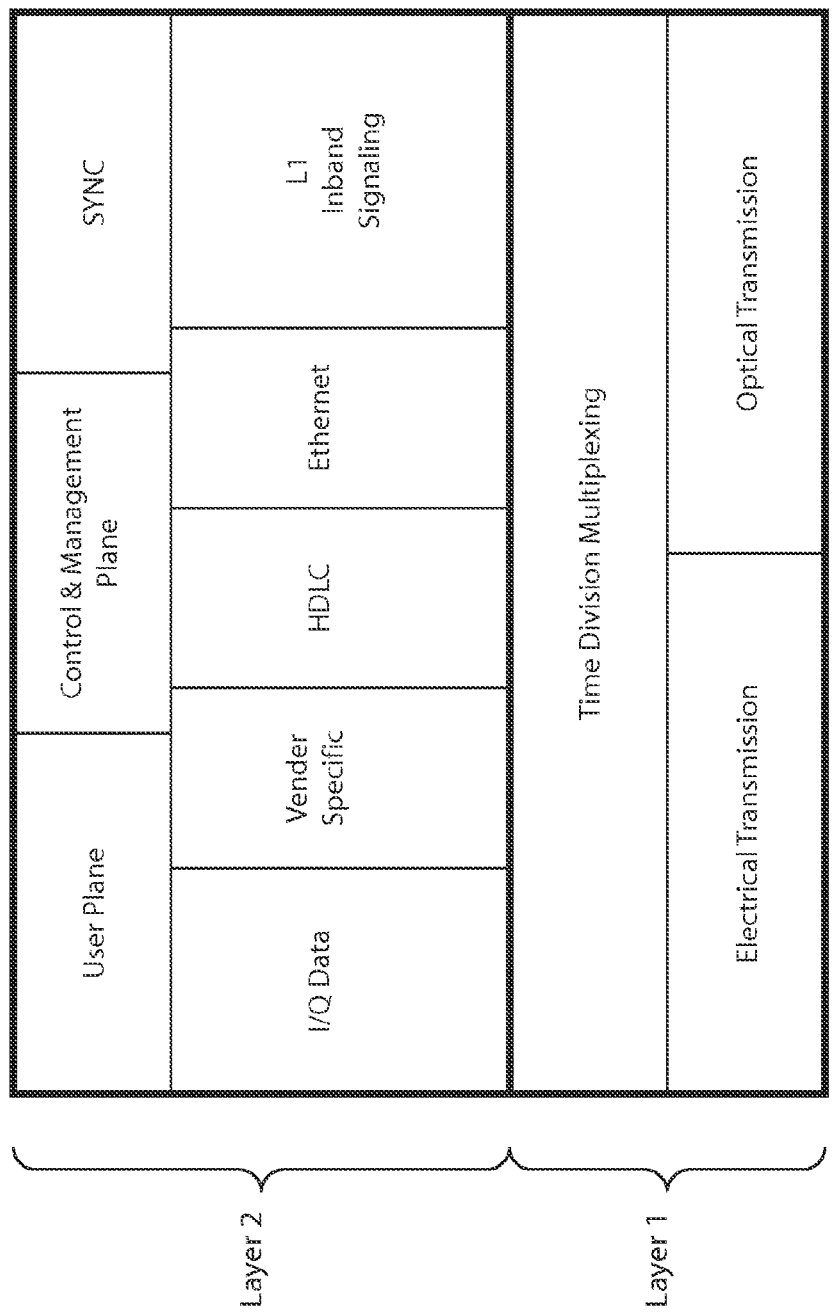
FIG. 7 illustrates an overview of the basic protocol hierarchy in accordance with the CPRI specification.

FIG. 7 illustrates an overview of the basic protocol hierarchy in accordance with the CPRI specification. The user plane includes the data that are to be transferred from the radio base station or DAS to the user devices and vice versa. The user data are in the form of in-phase and quadrature (I,Q) digital baseband samples. The control and management (C&M)

plane carries control information for the operation, administration and maintenance of the REC 22 and RE 24. The control and management data are exchanged between control and management entities with the REC 22 and radio equipment RE 24, and are given to higher protocol layers. Two different Layer 2 protocols support the control and management plane, High Level Data Link Control (HDLC) and Ethernet. The C&M data are multiplexed with the I,Q data of the user plane for transfer between the REC 22 and the RE 24. The C&M plane and the user plane may also transfer vendor specific information in assigned time slots in the framing structure. Vendor specific information includes, for example, operational parameters, configuration information or other data pertaining to a particular vendor's product.

The synchronization data flow transfers synchronization and timing information between REC 22 and RE 24. Synchronization data is used for alignment of frames and hyperframes, associated frame numbering, and support of 8B/10B coding. In FIG. 7, the inband signaling conveys information that is related to the link and is directly transported by the physical layer. This information is used for system startup, Layer 1 link maintenance and the transfer of time-critical information that has a direct time relationship to Layer 1 user data.

Several I,Q data flows will be multiplexed together along with the C&M data and transferred via the serial data link 26. Each I,Q data flow includes a stream of signal samples that reflects the data of one antenna for one carrier, referred to as an antenna-carrier (AxC). In general, without regard to specific protocol, one antenna-carrier refers to the digital signal samples representing the user data for either reception or transmission of one frequency division duplex (FDD) carrier at one independent antenna element at the air interface 32 of the RE 24. The signal samples representing the user data for a given antenna-carrier may be real-valued or complex-valued (I,Q) and the center frequency may be substantially zero (baseband) or an intermediate frequency (IF). In the CPRI specification and the OBSAI specification, the signal samples representing the user data comprise complex baseband (I,Q) signal samples for the corresponding carrier of the corresponding antenna. The CPRI specification describes a data structure called an AxC container that contains a predetermined number of the I,Q signal samples for one antenna-carrier. The AxC containers corresponding to the same antenna-carrier are assigned to certain bit fields in a radio data frame. The radio data frame may include multiple sets of AxC containers containing the user data corresponding to multiple antenna-carriers. The sets of AxC containers corresponding to different antenna-carriers are multiplexed to different bit fields in the radio data frame, as further described below.

Thus, in addition to the user plane (I,Q data), the CPRI specification defines an arrangement of C&M information as well as synchronization signals for exchange between REC 22 and RE 24. All information streams are multiplexed onto a digital serial communication line using the Layer 1 and Layer 2 protocols. The different information flows have access to the Layer 2 via service access points (SAPs). The I,Q data of different antenna carriers are multiplexed by time division multiplexing the AxC containers. The C&M data are either sent as inband signaling data (for time critical signaling data) or by Layer 3 protocols (not defined by the CPRI Specification) that reside on top of the Layer 2 protocols. The Layer 2 protocols HDLC or Ethernet are applied to the C&M data prior to time division multiplexing with the I,Q data. Finally, additional time slots are available for the transfer of any vendor specific information.

User data and control information are organized in a frame structure for transfer via serial data link 26. For implementations compatible with CPRI specification, the duration of a basic frame is based on the duration of one UMTS chip, which is defined as 1/3.84 MHz=260.416667 nanoseconds (ns). A CPRI basic frame consists of 16 words with index W=0, 1 . . . 15. The word with the index W=0, $\frac{1}{16}$ of the basic frame, is used for one control word. Since the duration of the basic frame is a fixed time interval, the length of the word depends on the line bit rate of the serial data link 26. The Common Public Radio Interface Specification Version 4.1 (Feb. 18, 2009) defines six alternative line bit rates for the serial data link, each with differing word lengths: 614.4 Mbps (word length=8 bits); 1228.8 Mbps (word length=16 bits); 2457.6 Mbps (word length=32 bits), 3072.0 Mbps (word length=40 bits), 4915.0 Mbps (word length=64 bits), 4915.2 Mbps (word length=64 bits), and 6144.0 Mbps (word length=80 bits).

Figure 8:
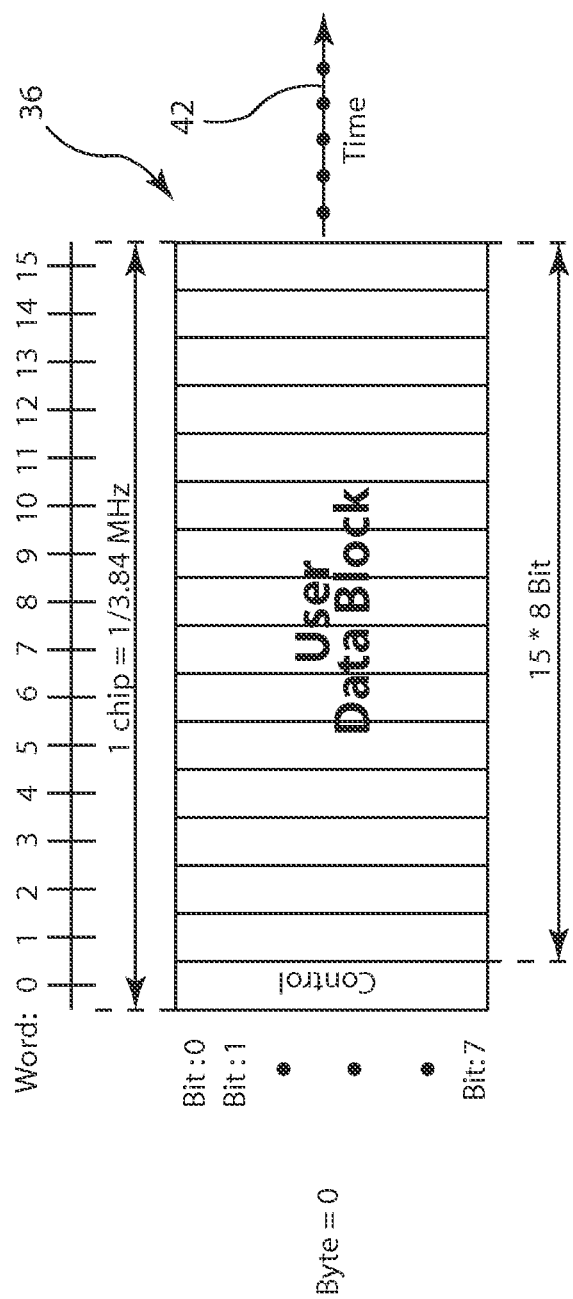
FIG. 8 illustrates the CPRI basic frame structure for the 614.4 Mbps line bit rate.
Figure 9:
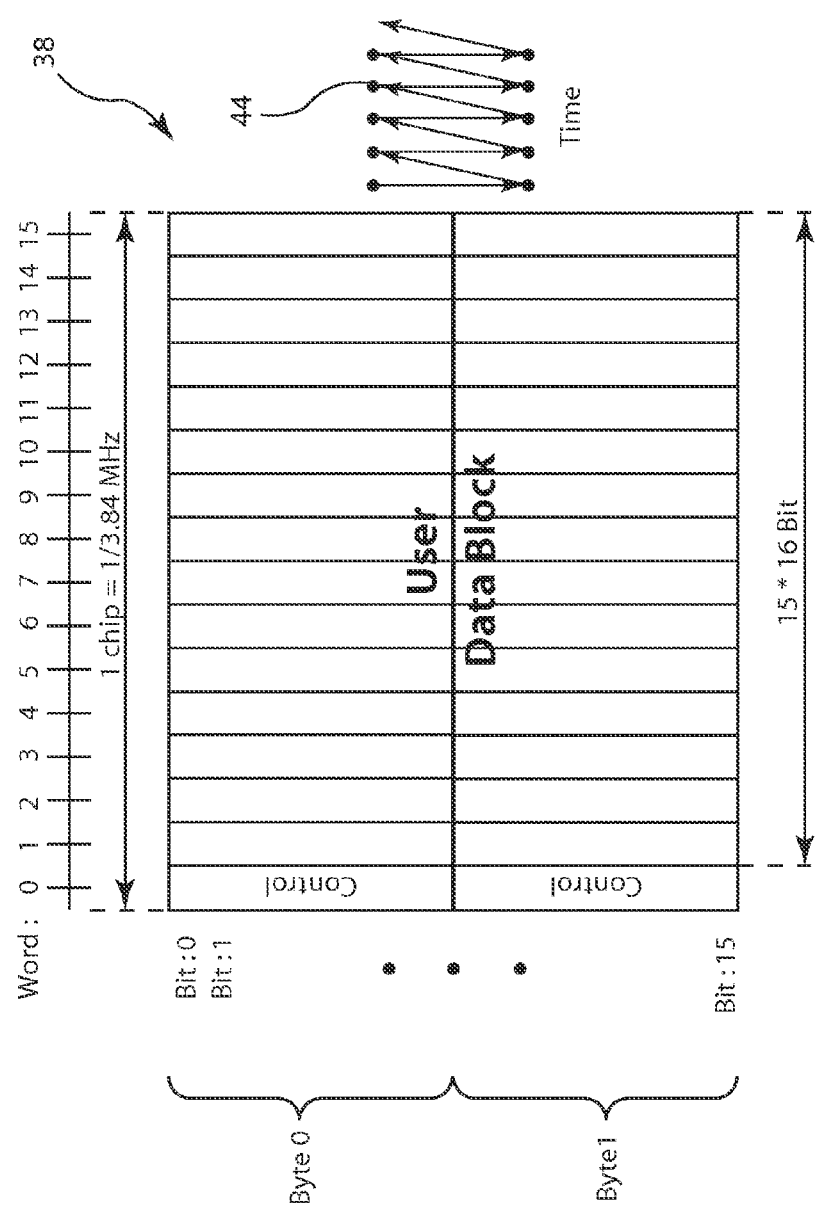
FIG. 9 illustrates the CPRI basic frame structure for the 1228.8 Mbps line bit rate.

FIG. 8 illustrates the basic frame structure for the 614.4 Mbps line bit rate. For this line bit rate, the basic frame 36 includes 16 words, wherein each word has a length of one byte, or 8 bits per word. Thus for the 614.4 Mbps line bit rate, the basic frame carries 128 bits, including 8 bits for control information and 120 bits for signal samples in the user data block. The time diagram 42 indicates the byte order for line encoding for the serial data link with 614.4 Mbps line rate of the serial data link. FIG. 9 illustrates the basic frame structure for the 1228.8 Mbps line bit rate. For this line bit rate, the basic frame 38 carries 16 words, wherein each word has a length of 2 bytes, or 16 bits per word. Thus for the 1228.8 Mbps line bit rate one basic frame includes 256 bits, including 16 bits for control information and 240 bits for signal samples in the user data block. The time diagram 44 indicates the byte order for line encoding for the 1228.8 Mbps line bit rate of the serial data link. The higher line rates add proportionately more bytes per word. The first word (word index=0) of the basic frame is reserved for control information, regardless of the size of the word.

Figure 10:
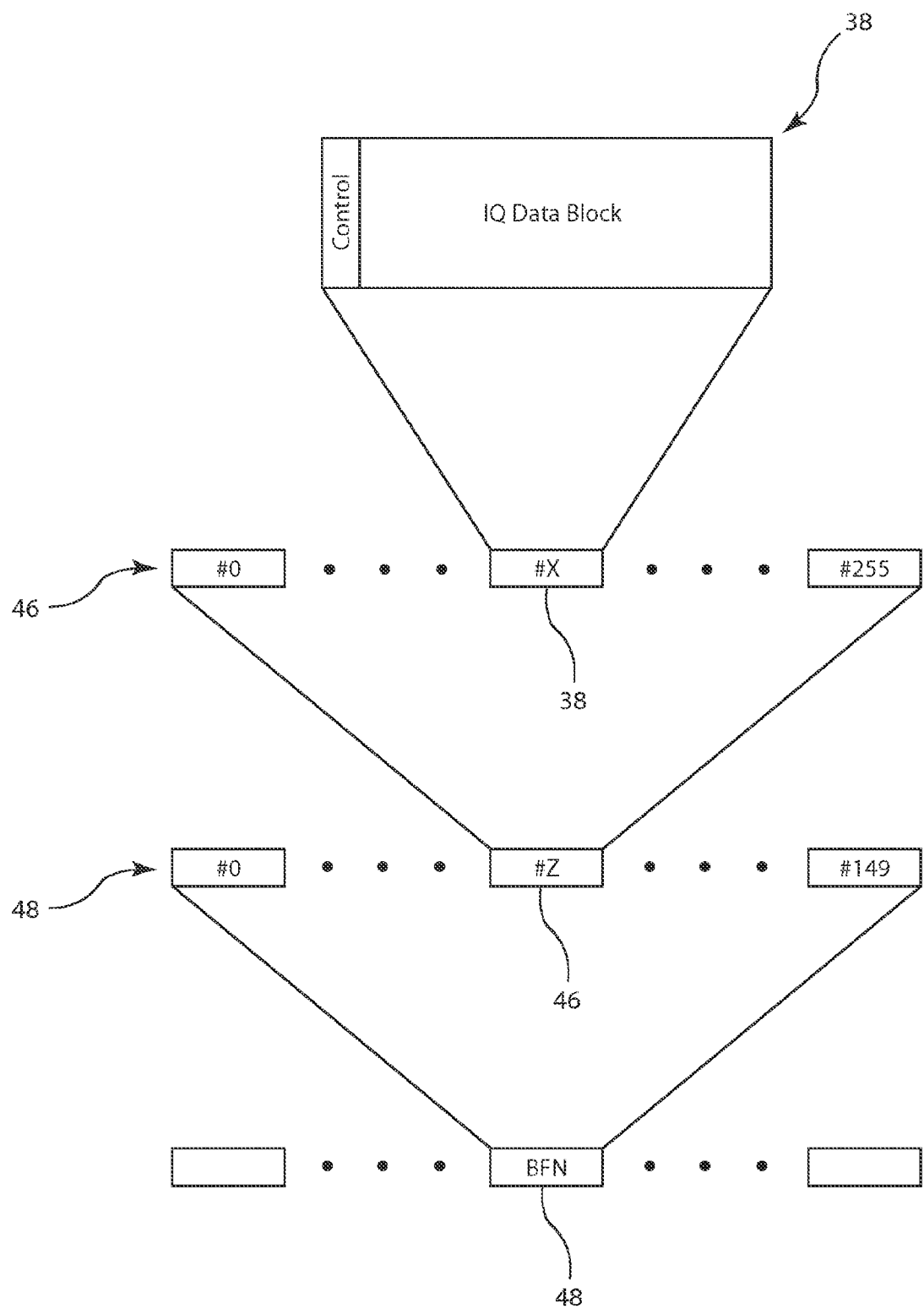
FIG. 10 illustrates the CPRI framing hierarchy for the 1228.8 Mbps line bit rate.

The CPRI specification defines a framing hierarchy where a sequence of basic frames form a hyperframe and a sequence of hyperframe form a CPRI 10 msec. frame, also called a Node B frame. FIG. 10 illustrates the CPRI framing hierarchy for the 1228.8 Mbps line rate. The basic frame 38 corresponds to that illustrated in FIG. 9. However, the same hierarchy is applied for all of the CPRI line bit rates because the duration of the basic frame is constant, although the number of bits per basic frame varies with the line rates. A sequence of 256 basic frames having indices #0 to #255, where basic frame 38 has index #X, form a hyperframe 46. A sequence of 150 hyperframes having indices #0 to #149, where hyperframe 46 has index #Z, has a duration of 10 msec. and forms a UMTS radio frame 48, also referred to as CPRI 10 msec. frame or Node B frame. Each UMTS radio frame 48 is assigned a Node B frame number (BFN).

Figure 11:
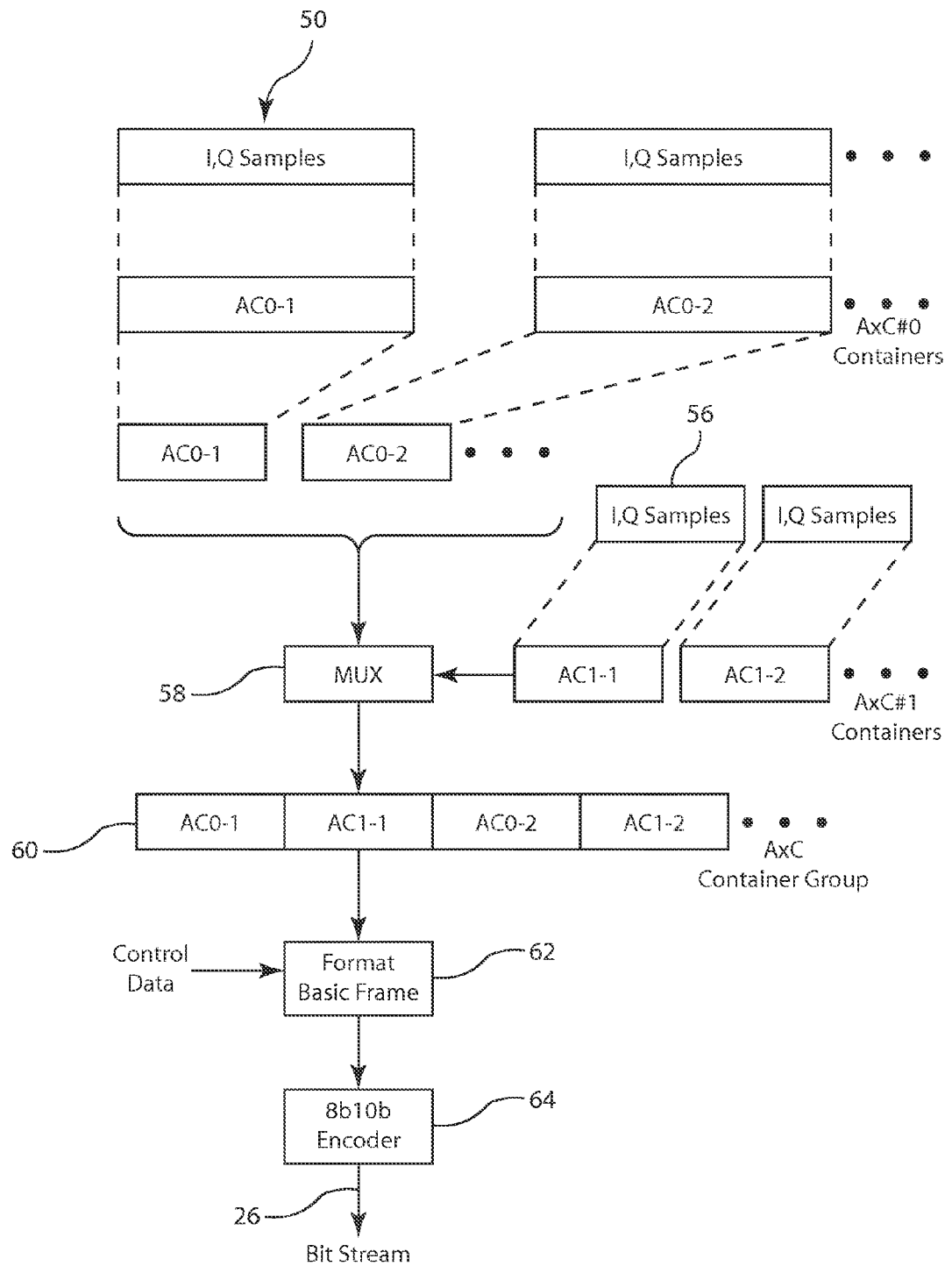
FIG. 11 shows an example of mapping I,Q data for transfer according to the CPRI protocol.

FIG. 11 shows an example of mapping I,Q data for transfer according to the CPRI protocol. The CPRI protocol provides a radio data frame, or basic frame, having a plurality of AxC containers. A set of AxC containers in the basic frame is assigned to a corresponding antenna-carrier. In the example of FIG. 11, the I,Q signal samples 50 from the same antenna-carrier are mapped to the set of AxC containers AC0-1 and AC0-2 corresponding to a first antenna-carrier, AxC#0. The I,Q signal samples 56 are mapped to the set of AxC containers AC 1-1 and AC 1-2 corresponding to a second antenna-carrier, AxC#1. The multiplexer 58 interleaves the AxC containers from the two antenna-carriers to form a sequence of multiplexed containers referred to as an AxC container group 60.

The basic frame formatter 62 forms a basic frame having a number of AxC container groups in the I,Q data block and inserts the control data. The number of AxC container groups depends on the line bit rate. The control data occupies the first word of the basic frame (index=0). The AxC container groups occupy the I,Q data block of the basic frame, as illustrated in FIGS. 8 and 9. The 8b/10b encoder 64 applies an 8b10b code to each byte of data in the basic frame. The 8b/10b code is defined by the standard IEEE 802.3-2005. The 8b/10b encoder 64 is part of the serializer/deserializer (SERDES) interface for the serial data link 26.

Figure 12:
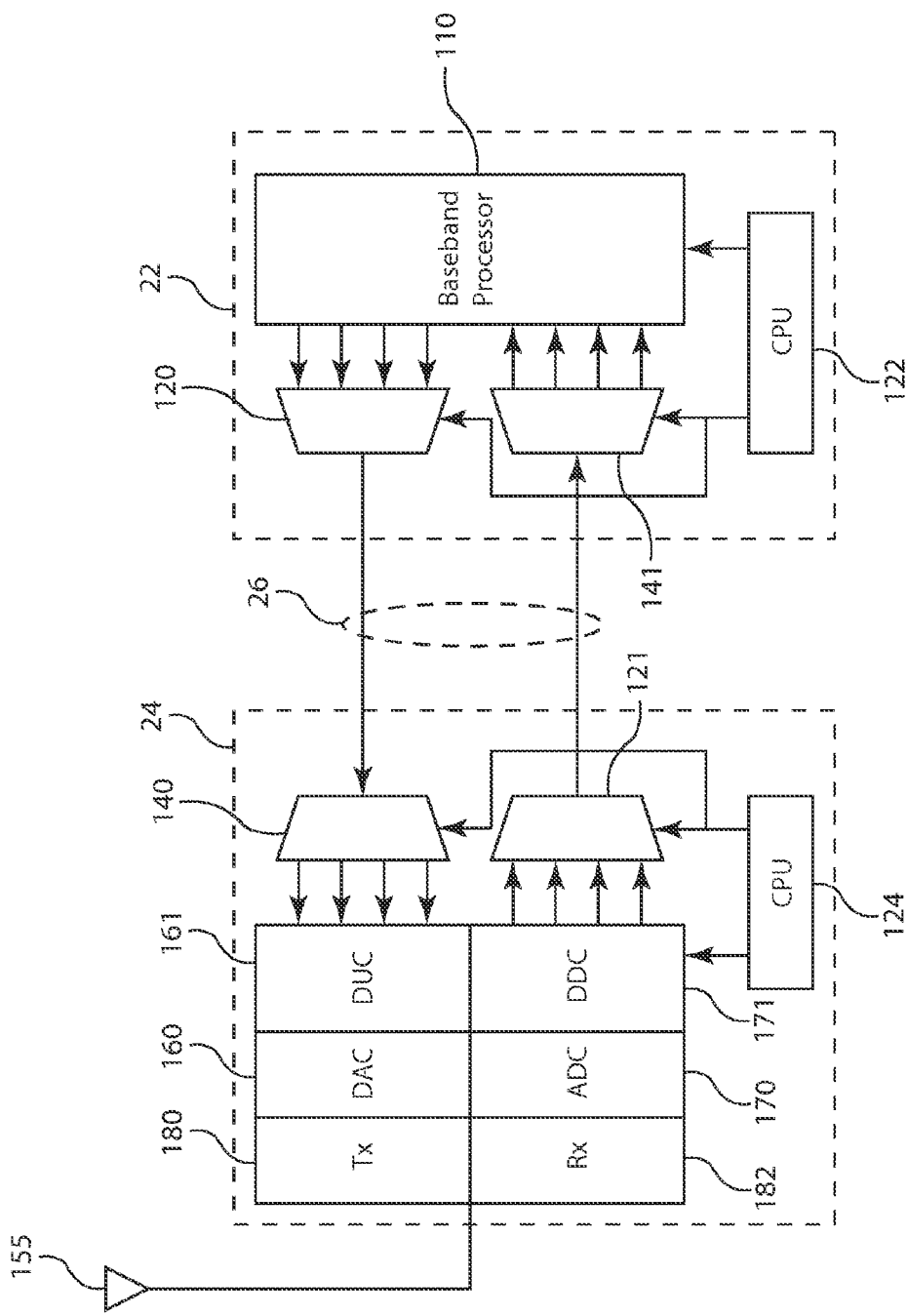
FIG. 12 gives an overview of the functions of the RE and REC.

The block diagram of FIG. 12 gives an overview of the functions of the RE 24 and REC 22. The RE 24 receives and transmits multiple frequency channels of signal samples for each independent antenna, or multiple antenna-carriers. In this example, there are four channels of signal samples corresponding to four antenna-carriers associated with the antenna 155 and the signal samples transferred over the serial data link 26 are baseband I,Q signal samples. For the transmit path, or downlink from the REC 22, the multiplexer 120 multiplexes the signal samples from multiple user data streams into a single serial data stream for transfer over the serial data link 26. At the RE 24, the demultiplexer 140 demultiplexes the serial data stream to recover the four streams of baseband I,Q signal samples. The digital upconverter (DUC) 161 upconverts each stream of baseband I,Q signal samples to respective carrier frequencies to form a channelized signal. Each upconverted digital signal occupies a particular frequency channel of the resulting channelized signal. The DAC 160 converts the channelized signal to an analog signal. The transmitter (Tx) 180 may filter, amplify and convert the analog signal to the appropriate RF frequency for transmission by the antenna 155. The downlink RF signal is transmitted via the antenna 155 over the air to the UE devices.

For the receive path, or uplink from the UE devices, the receiver (Rx) 182 receives the RF signal via the antenna 155 at the RE 24. The ADC 170 digitizes the received signal to produce a digital signal that represents the channelized signal data. The digital downconverter (DDC) 171 downconverts the channels to form corresponding streams of baseband I,Q signal samples, one stream for each channel. The multiplexer 121 multiplexes the streams of baseband signal samples to form a serial data stream. The serial data stream is transferred via the serial data link 26 to the REC 22. The demultiplexer 141 demultiplexes the serial data to restore the four streams of I,Q signal samples. The baseband processor 110 performs signal processing functions on the streams of I,Q signal samples. The signal processing functions may include channel decoding, de-interleaving, de-spreading, multiple-input multiple-output (MIMO) processing, and demodulation functions.

The multiplexers 120 and 121 combine the multiple streams of the baseband I,Q signal samples. For embodiments based on the CPRI specification, the multiplexers 120 and 121 apply the CPRI framing protocol to map the I,Q signal samples to appropriate AxC containers as described above. The demultiplexers 140 and 141 recover the individual streams of I,Q signal samples from the received serial data. For the serial data in the CPRI format, the demultiplexers 140 and 141 retrieve the I,Q signal samples from the AxC containers to reconstruct consecutive I,Q signal samples for individual signal streams. In the REC 22, a central processing unit (CPU) 122, microcontroller or dedicated controller logic provides control of the multiplexer 120, the demultiplexer 141 and the baseband processor 110. The CPU 122 provides configuration parameters for the framing/deframing and the control and management data that will be multiplexed with the user data. In the RE 14, a CPU 124 receives the control and management data and provides configuration parameters for framing/deframing.

The functions described with respect to FIG. 12 are general for a radio transceiver system that transfers baseband I,Q signal samples between REC 22 and RE 24. Different terminology may be used, such as baseband module for REC 22 and RF module for RE 24. The multiplexers 120 and 121 and demultiplexers 140 and 141 may use another radio data interface protocol for the baseband I,Q signal samples, such as that described in the OBSAI specification, or in an earlier or future version of the CPRI specification. Alternative architectures for a radio transceiver system may transfer real-valued or complex-valued (I,Q) signal samples centered at a nonzero intermediate frequency (IF).

A typical LAN delivers data among multiple computers, user terminals or other devices in a building or structure. Data are communicated among the devices in addressed packets, or frames, that are individually transmitted from the source device and delivered to the destination device. The data packet, or frame, has a number of data bits including bit fields defined for specific purposes according to a protocol for the LAN. A data packet may include bit fields for address information and a payload portion for the desired information. The address information includes for addressed packet protocols like Ethernet a destination address associated with a destination device and a source address associated with a source device. The destination device retrieves any packets from the transmission medium of the LAN having its destination address and processes the packet's contents. The payload portion of the data packet may itself encapsulate a packet for another protocol, such as for a higher layer in the ISO-OSI network architecture. In this case, the destination device would extract and process the payload portion according to the corresponding protocol. In this description, "Ethernet" refers to a protocol for packet-based communication in a LAN. The data packets organized in accordance with an Ethernet protocol are referred to as Ethernet packets or Ethernet frames and their contents are referred to as Ethernet data.

The packet-based communication approach commonly used in LANs differs from the radio data interface protocols. For the packet-based communication, the payload portion of the packet contains data for a destination device associated with the destination address of the packet. In contrast for the radio data interface, the user data portion of the radio data frame carries data destined for multiple user equipments. In the CPRI protocol, for example, each of the AxC containers in the user data portion of a single frame carries signal samples destined for a particular user equipment.

The IEEE 802.3 Standard comprises a group of specifications for LAN technology that has evolved over time. The IEEE 802.3-2002 Standard specifies frames, or packets, having sizes between 64 bytes and 1518 bytes, payload sizes between 46 bytes and 1500 bytes, a destination address field, a source address field and additional defined bit fields. While the IEEE 802.3 Standard has not officially adopted the term "Ethernet", it is widely considered an Ethernet protocol. In this description, the preferred LAN uses a protocol in compliance with an IEEE 802.3 Standard. Alternatively, the LAN may use another packet-based communication technology.

A LAN may communicate with the broader Internet via a wide area network (WAN) or a metropolitan area network (MAN). A WAN may cover distances of several kilometers to thousands of kilometers, while a MAN may cover several kilometers. The WAN or MAN includes resources for delivering data packets from elsewhere in the Internet to the appropriate LAN.

Other network devices described herein include a switch and a gateway. A switch functions to direct a data packet to a LAN segment in the LAN based on the destination address of the data packet. For example, a switch may have a single input port and multiple output ports, each output port in communication with a corresponding LAN segment serving various destination devices. The switch analyses the destination addresses of the data packets to direct the packets to the appropriate output port for the corresponding LAN segment. The destination device on the corresponding LAN segment may then retrieve the appropriate packets. A gateway functions as a translator to permit intercommunication between different network protocols. For example, a gateway may provide protocol conversion of input data having a first protocol to provide output data having a second protocol that is compatible with a destination device or network.

Figure 13:
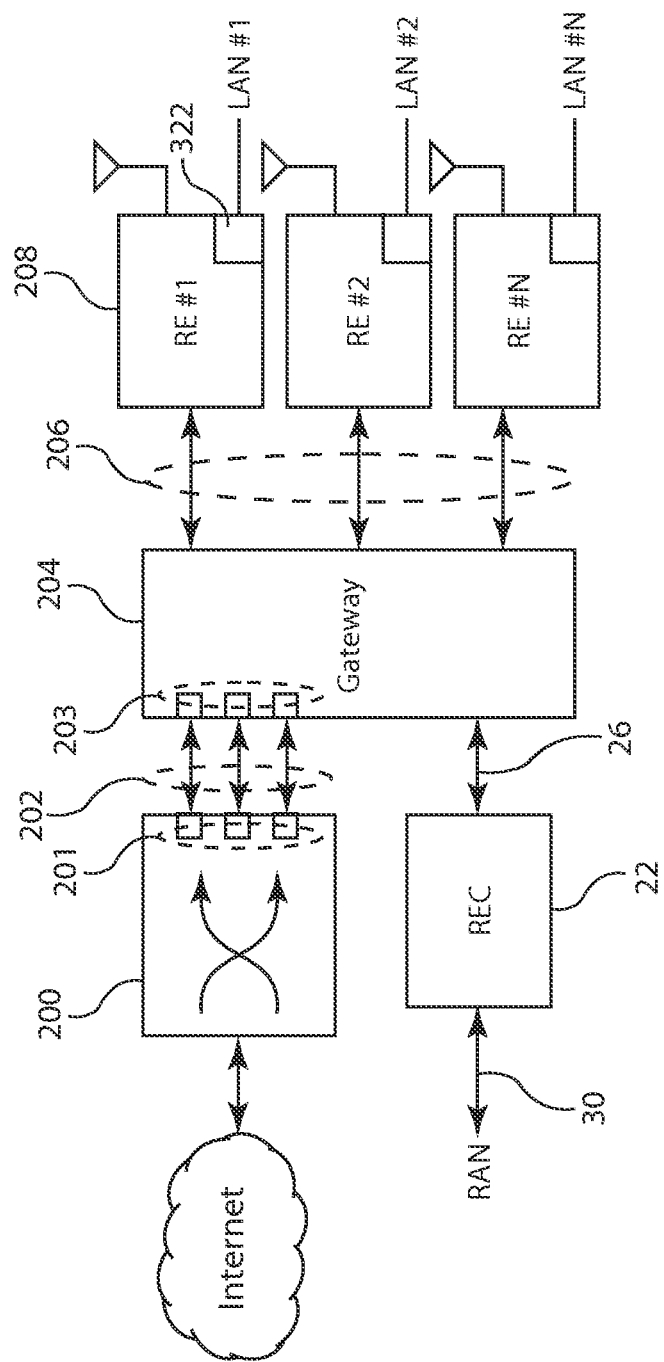
FIG. 13 illustrates an example of a DAS that distributes data within a building or structure from radio network, LAN and Internet sources, in accordance with a preferred embodiment.

FIG. 13 illustrates an example of a DAS that distributes data within a building or structure from both radio network, LAN and Internet sources, in accordance with a preferred embodiment. In this example, the DAS includes three REs 208 and three LAN segments, in communication with respective REs 208. The REC 22 communicates with the radio access network (RAN) via Iub interface 30, as described above. Alternatively, the REC 22 communicates via head-end antenna to the RAN. For the down link, the REC 22 provides framing of the I,Q signal samples, C&M data and SYNC data as described above, preferably in accordance with the CPRI specification. The REC 22 transfers the CPRI frames via a CPRI interface to the gateway 204. For distributing data from the Internet, an Ethernet switch 200 receives Internet data packets from a MAN, WAN or other network service. The data packet includes the destination address associated with a device in the LAN. Preferably, the LAN operates in accordance with an Ethernet protocol, such as the IEEE 802.3 Standard, so that the data packets comprise Ethernet frames. The Ethernet switch 200 directs the Ethernet frames to the LAN serving the building. The Ethernet switch 200 directs the Ethernet frames to respective switch ports 201 based on the destination addresses of corresponding LAN segments. The Ethernet switch 200 performs conventional operations for directing the Ethernet frames, however at least one of the switch ports 201 is coupled by via the switch interface 202 to the gateway 204. In a conventional LAN, each switch port 201 would be connected directly to the corresponding LAN segment. The Ethernet switch 200 transfers the directed Ethernet frames to corresponding ports 203 of the gateway 204 via the switch interface 202. The switch interface 202 preferably comprises a GbE interface, such as 1000Base-T. For this example, the Ethernet switch 200 directs each Ethernet frame to the appropriate one of three switch ports 201 based on the destination address of the Ethernet frame. Each switch port 201 is connected via the switch interface 202, i.e. GbE interface, to a corresponding gateway port 203 of the gateway 204. The gateway 204 receives the Ethernet frames over three gateway ports 203. The gateway 204 reframes the data of the received Ethernet frames in accordance with a radio data interface protocol for transmission to the RE 208 that is associated with the destination LAN segment. The RE 208 includes a LAN interface 322 that reconstructs the Ethernet frames for transmission to the corresponding LAN segment, as further described below. The LAN segment may be wired LAN segment or wireless LAN segment served, for example, by a Wi-Fi access point.

The gateway 204 receives both the Ethernet frame traffic (e.g. addressed packets) from the Ethernet switch 200 and the CPRI frames from the REC 22. The gateway 204 disassembles the CPRI frames received from the REC 22 and assembles mixed-data frames that accommodate both the I,Q data and the Ethernet data. In a preferred embodiment, the gateway 204 applies the CPRI framing protocol to map the I,Q data and the Ethernet data into AxC containers, as further described below. The gateway 204 distributes the mixed-data frames to the corresponding REs 208 via respective data transfer interfaces 206. The data transfer interface 206 preferably comprises a GbE interface, such as 1000Base-T. In addition to the conventional functions of the RE 24 described above, the RE 208 includes additional functions for separating the I,Q data from the Ethernet data and a LAN interface 322 for communication with the LAN segment. Each RE 208 demultiplexes the AxC containers of the received mixed-data frames and recovers the I,Q signal samples and the Ethernet data from respective AxC containers. The RE 208 processes the I,Q signal samples for transfer to UE devices over the air interface, as described above with respect to FIG. 12. The RE 208 reassembles the Ethernet frames for transfer to the corresponding LAN segment, as described below.

For the uplink, in addition to processing the I,Q signal samples of signals received from the air interface, the RE 208 has additional functions for receiving Ethernet frames from the LAN segment. The RE 208 multiplexes the I,Q signal samples and the Ethernet data for transfer to the gateway 204. For an embodiment in accordance with the CPRI specification, the RE 208 maps the I,Q data and the Ethernet data to respective AxC containers to form mixed-data frames structured like CPRI frames. The mixed-data frames are transmitted via the data transfer interface 206 to the gateway 204. The gateway 204 demultiplexes the received mixed-data frames and separates the I,Q data from the Ethernet data. The gateway 204 reframes the AxC containers containing I,Q data and the C&M data to form conventional CPRI frames. The gateway 204 transfers the CPRI frames via the serial data link 26 to the REC 22. The REC 22 performs the usual processing of the I,Q data as described above. The gateway 204 assembles the Ethernet frames for transfer to the Ethernet switch 200 and ultimately for transfer to the Internet.

Figure 14:
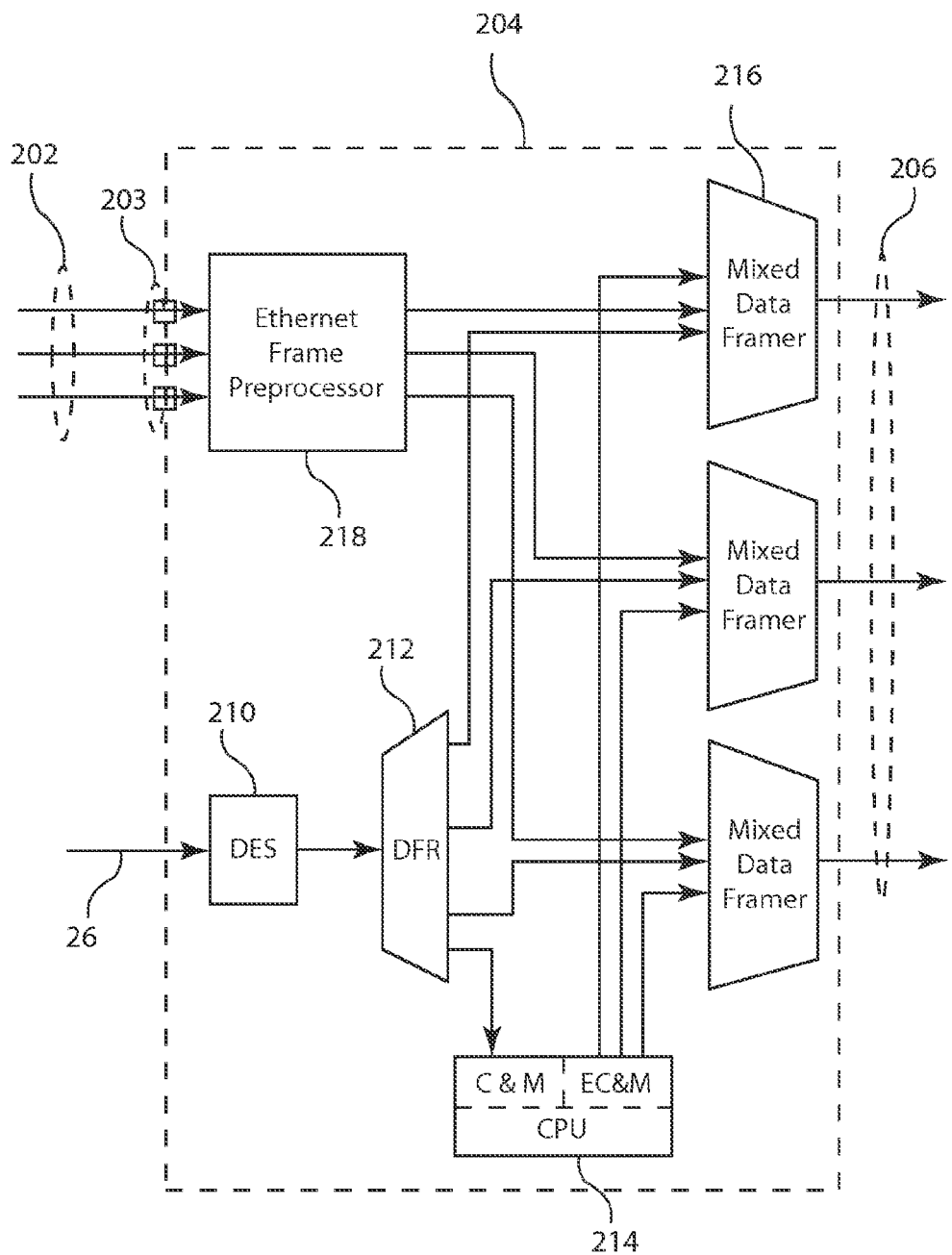
FIG. 14 is an embodiment of downlink functions of the gateway in communication with three REs.

FIG. 14 is an embodiment of downlink functions of the gateway 204 in communication with three REs 208, corresponding to the example of FIG. 13. In a CPRI-based embodiment for the downlink, the gateway 204 receives conventional CPRI frames from REC 22 via the serial data link 26 in accordance with the CPRI specification. The CPRI basic frames received by the deframer (DFR) 212 are formatted as described with respect to FIG. 11. The deserializer (DES) 210 provides the line decoding for serial data interface 26, including 8b/10b decoding to extract the data that were 8b/10b encoded. The deframer 212 extracts the I,Q data from the AxC containers and the C&M data from the control words of the frames. The deframer 212 demultiplexes the AxC containers to provide streams of consecutive baseband I,Q signal samples of corresponding antenna-carriers to the mixed-data framer 216 appropriate for the destination RE 208. The destination RE 208 may support one or more antenna-carriers. The Ethernet frame preprocessor 218 receives the directed Ethernet frames from the respective gateway ports 203 and provides any buffering or padding that may be needed for rate conversion and provides the Ethernet data to the mixed-data framer 216 for the corresponding RE 208. Each mixed-data framer 216 maps the I,Q signal samples and the Ethernet data to the plurality of AxC containers to form a mixed-data frame for the corresponding RE 208. The mixed-data framer 216 provides a set of AxC containers provisioned for the I,Q signal samples of a corresponding antenna-carrier and a set of AxC containers for Ethernet data. The mixed-data framer 216 may include one or more signal data buffers to receive the I,Q signal samples of the corresponding antenna-carriers. The mixed-data framer 216 maps the baseband I,Q signal samples to the subsets of AxC containers assigned to the corresponding antenna-carriers supported by the destination RE 208. The mixed-data framer 216 may include one or more Ethernet data buffers to receive the Ethernet data corresponding to the one or more LAN segments connected to the RE 208. The mixed-data framer 216 maps the Ethernet data to the set of AxC containers assigned to the Ethernet data for the corresponding LAN segment. The gateway 204 includes a control processor or CPU 214 that provides control parameters indicating the container assignments to the respective mixed-data framers 216. The CPU 214 receives the C&M data extracted from the CPRI basic frames and provides extended C&M data to the respective mixed-data framers 216. The extended C&M data may include container assignment information for the Ethernet data as well as the I,Q data. The system operator may provide the container provisioning information to the CPU indicating, for example, the containers in the CPRI basic frame allocated to the Ethernet data and to I,Q data, respectively. The CPU may encode the provisioning information and other extended C&M information in the "vendor specific" portion of the C&M data, as defined in the CPRI Specification, or to an unused, free or unallocated portion of the user plane.

Figure 15:
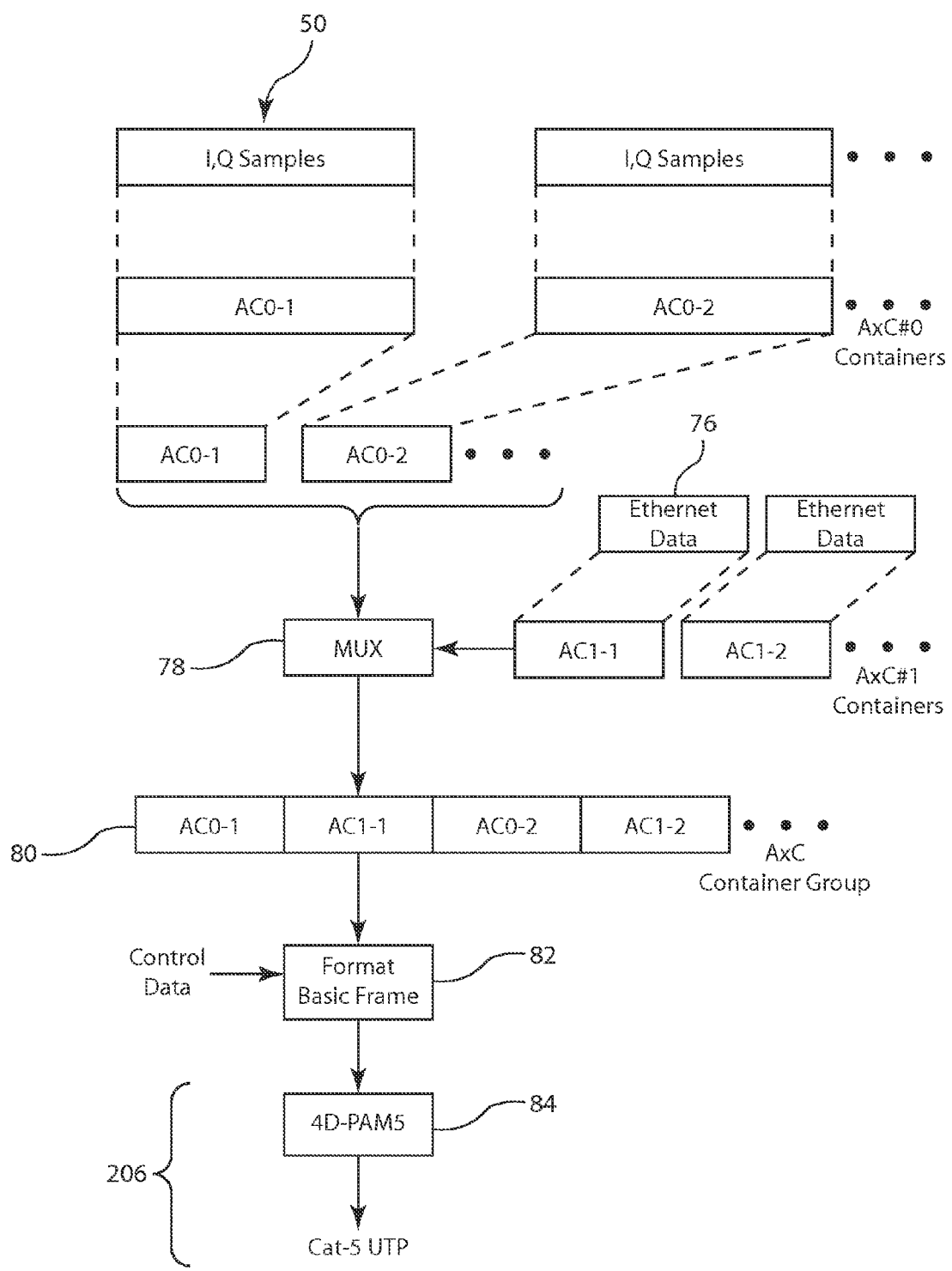
FIG. 15 illustrates an example of mapping I,Q data and Ethernet data by the mixed-data framer.

FIG. 15 illustrates an example of mapping I,Q data and Ethernet data by the mixed-data framer 216. In this example, the mixed-data framer maps the I,Q signal samples 50 to the set of AxC containers AC0-1 and AC0-2 assigned to the antenna-carrier AxC#0. The mixed-data framer 208 maps the Ethernet data 76 received from the Ethernet frame preprocessor 218 to the set of AxC containers AC1-1 and AC1-2 assigned to Ethernet data. The multiplexer 78 interleaves the AxC#0 containers containing I,Q data and AxC#1 containers containing Ethernet data in alternating slots to form a sequence of multiplexed containers, or a mixed-data AxC container group 80. The basic frame formatter 82 forms the mixed-data frame having a number of mixed-data AxC container groups 80 based on the line rate. The basic frame formatter inserts the control information in the control word, as described for the CPRI basic frames. The C&M data may include any extended C&M data in the vendor-specific area. The mixed-data frame includes both I,Q data and Ethernet data mapped to AxC containers and C&M data mapped to the control word according to the CPRI protocol for a basic frame. The basic frame formatter 82 applies the CPRI frame hierarchy to the mixed-data frames, as described with respect to FIG. 10.

In a preferred embodiment, the mixed-data frames are processed for transfer via category 5 (Cat-5) unshielded twisted pair (UTP) media, in accordance with the 100Base-T or 1000Base-T physical layer described in the IEEE Standards such as 802.3ab. The Cat-5 UTP cable transmits data over four unshielded twisted pairs of copper wire. The 1000Base-T physical layer processing applies an encoding scheme, referred to as four-dimensional trellis-coded 5-level pulse-amplitude modulation (4D-PAM5), for transmitting data over the Cat-5 UTP media. In the 4D-PAM5 encoding scheme, each block of eight bits of input data is mapped to 4 symbols using 4-dimensional trellis coding. Each symbol is selected from one of 5 amplitude values [−2, −1, 0, 1, 2], referred to as 5-level pulse amplitude modulation (PAM5). The four symbols are transmitted simultaneously on the four twisted pairs of the Cat-5 UTP media. The 4D-PAM5 encoding includes scrambling that facilitates output DC balance and full duplex transmission on all four twisted pairs, with each pair providing a 250 Mbps full duplex transmission data rate. In the preferred embodiment, the 4D-PAM5 encoder 84 is applied to the mixed-data frames having the CPRI frame structure instead of conventional Ethernet frames. The 4D-PAM5 encoder 84 converts an 8-bit block of the of the sequence mixed-data frames received from the basic frame formatter 82 to a set of four PAM5 signals. Each set of four PAM5 signals is transmitted over the four data lines of the Cat-5 UTP media to deliver mixed-data frames at a rate of 1 Gbps over the data transfer interface 206 to the RE 208.

Referring to FIG. 11, the CPRI Specification indicates applying the 8b/10b encoder 64 to the basic frames for transmission over optical fiber media, such as GbE Standard 1000Base-SX/LX, or shielded twisted pair (STP) copper media 1000Base-CX. In the preferred embodiment using UTP copper media, the 4D-PAM5 encoder 84 is applied to the basic frames instead of 8b/10b encoding. The 1000Base-T physical layer supports transmission of up to 100 meters, which is advantageous for in-building applications. Transmission over distances greater than 100 meters can be accomplished by multiple 1000Base-T links connected by conventional Ethernet repeaters.

Figure 16:
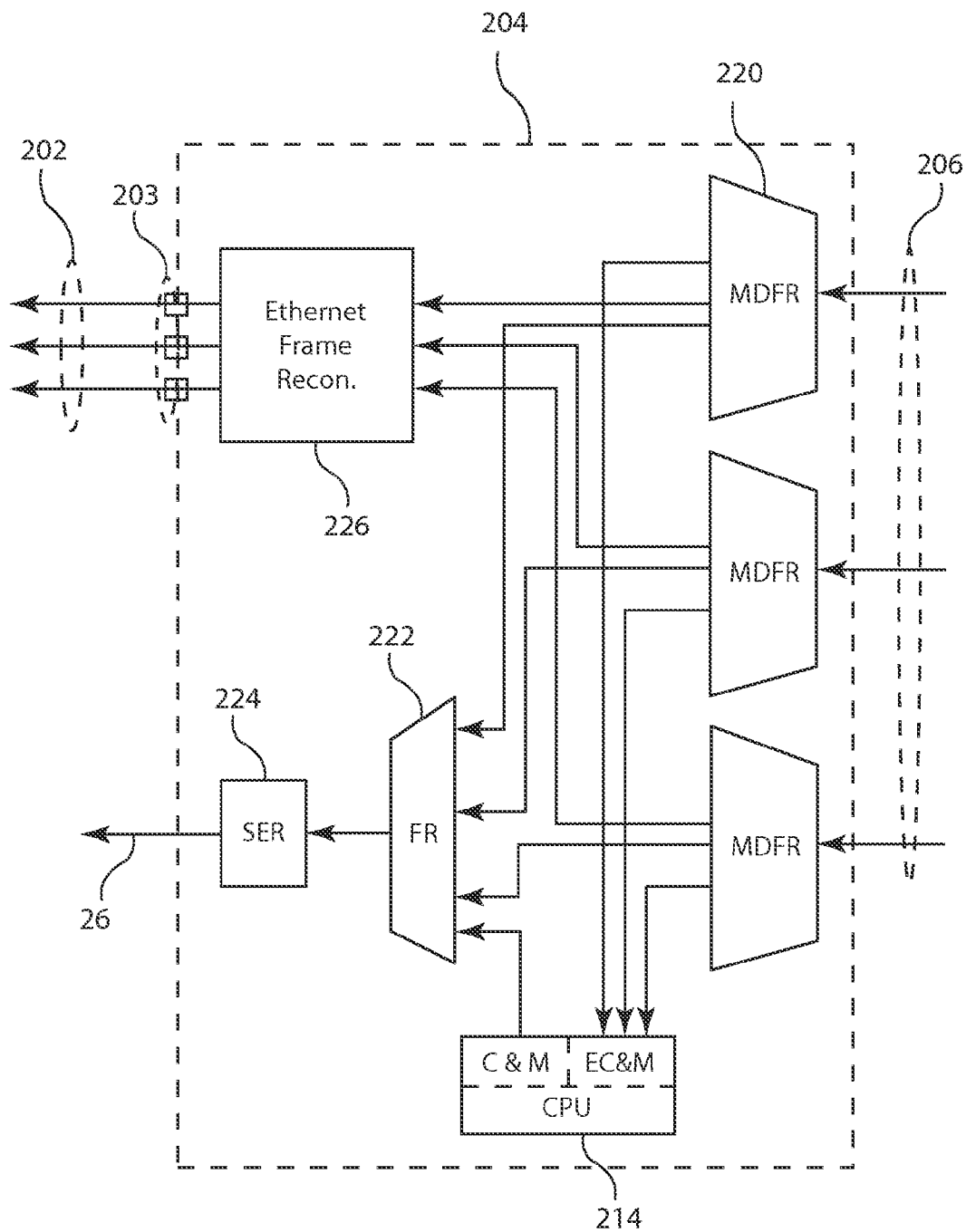
FIG. 16 is an embodiment of uplink communication functions of the gateway connected with three REs.

FIG. 16 is an embodiment of uplink communication functions of the gateway 204 connected with three REs 208, corresponding to the example of FIG. 13. Mixed-data frames from the REs 208 are received via respective data transfer interfaces 206. Each mixed-data deframer (MDFR) 220 retrieves the extended C&M (EC&M) data from the control words of the mixed-data frames. The CPU 214 determines the container assignment parameters from the EC&M data and provides them to the MDFR 220. The MDFR 220 separates the sets of containers I,Q data and Ethernet data based on the container assignments. The MDFR 220 demultiplexes the AxC containers to produce a stream of Ethernet data from the set of containers corresponding to the LAN segment and streams of I,Q signal samples from the set of containers corresponding to the antenna-carriers. The MDFR 220 provides the Ethernet data to an input buffer of the Ethernet frame reconstructor 225. The Ethernet frame reconstructor 226 restores the conventional Ethernet frame structure to the Ethernet data to form reconstructed data packets. The Ethernet frame reconstructor 226 may remove any padding bits and perform any rate conversion that may be necessary for transfer of the reconstructed data packets via the switch interface 202. The reconstructed data packets The MDFR 220 provides the I,Q signal samples of the corresponding antenna-carriers to an input buffer of the framer 222. The framer 222 maps the I,Q signal samples of corresponding antenna-carriers to corresponding sets of AxC containers using the conventional radio data interface protocol. The CPU 214 and provides the conventional CPRI AxC container assignments and C&M data pertinent for the I,Q data framing. The framer 222 formats the I,Q data and the C&M data received from the CPU 214 to produce conventional CPRI basic frames, as described with respect to FIG. 11. The serializer (SER) 224 performs 8b/10b encoding (i.e. block 64 of FIG. 11) and other operations for transferring the CPRI frames via the serial data link 26 to the REC 22.

Figure 17:
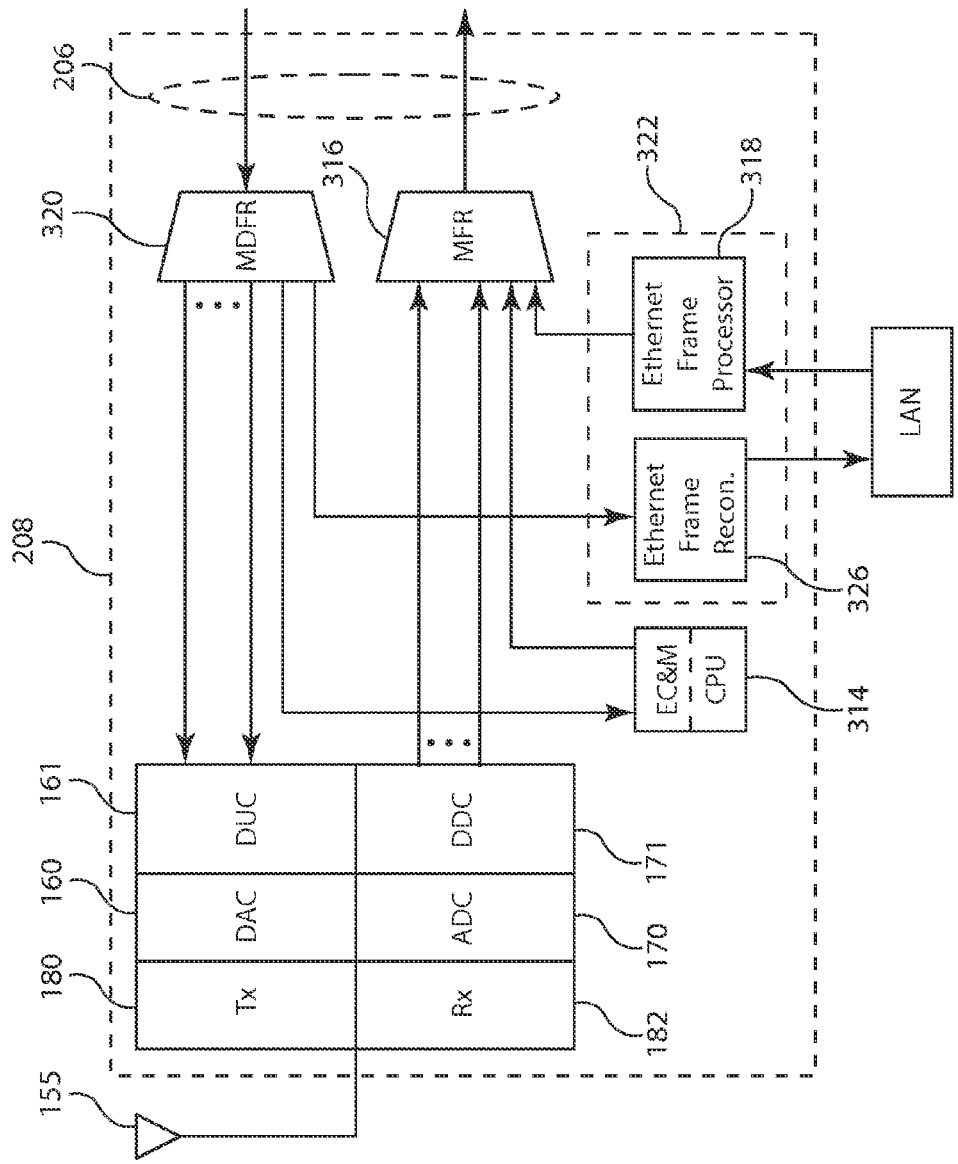
FIG. 17 is a block diagram of the RE, in accordance with a preferred embodiment.

FIG. 17 is a block diagram of an embodiment of the RE 208 of FIG. 13. For the downlink, the RE 208 receives mixed-data frames via the data transfer interface 206 from the gateway 204. The mixed-data deframer (MDFR) 320 retrieves the extended C&M (EC&M) data from the control words of the mixed-data frames. The CPU 314 determines the container assignment parameters from the EC&M data and provides them to the MDFR 320. The MDFR 320 separates the sets of containers containing I,Q data and Ethernet data based on the container assignments. The MDFR 320 demultiplexes the containers to produce a stream of Ethernet data for the corresponding LAN segment and streams of I,Q signal samples of the corresponding antenna-carriers. The I,Q signal samples corresponding to the various antenna-carriers are processed for transmission by the DUC 161, DAC 160 and Tx 180, as described above with respect to FIG. 12. The Ethernet frame reconstructor 326 restores the conventional Ethernet frame structure to the Ethernet data. The Ethernet frame reconstructor 326 may remove any padding bits and provide any rate conversion necessary for transfer to the corresponding LAN segment.

For the receive path, or uplink, from the UE devices, the Rx 182, ADC 170 and DDC 171 form baseband I,Q signal samples, as described with respect to FIG. 12. The Ethernet frame preprocessor 318 receives the Ethernet frames from the corresponding LAN segment and provides a buffer and any padding that may be needed for rate conversion. The mixed-data framer (MFR) 316 may include buffers to receive the I,Q signal samples and the Ethernet data. The CPU 314 provides the AxC container assignments to the MFR 316. The MFR 316 maps the I,Q signal samples and the Ethernet data to respective AxC containers based on AxC container assignments. The MFR 316 multiplexes the AxC containers having the I,Q data, the AxC containers having the Ethernet data and inserts the EC&M data in the control words, as described with respect to FIG. 15. The CPU 314 provides EC&M data to the mixed-data framer 316. The CPU 314 provides control of other components of the RE 204, as described with respect to FIG. 12. The LAN interface 322 may include other conventional components for communication with the corresponding LAN segment.

Figure 18:
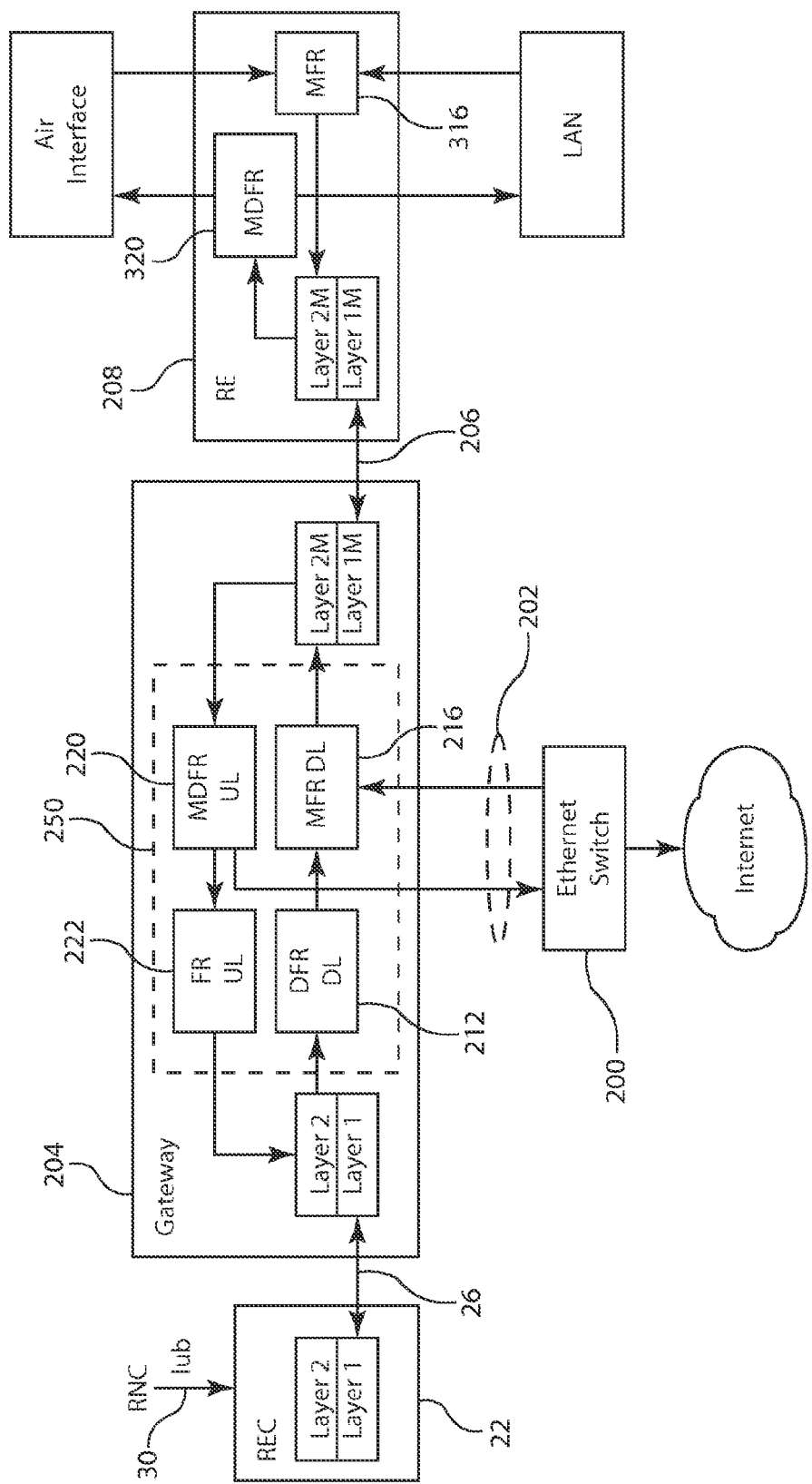
FIG. 18 illustrates an overview of communication between the REC, gateway and RE.

FIG. 18 illustrates an overview of communication between REC 22, gateway 204 and RE 208. The REC 22 communicates with the gateway 204 across the serial data link 26 using a conventional protocol for Layer 1 and Layer 2. The translator block 250 of the gateway 204 includes the transition operations from the conventional protocol for Layer 1 and Layer 2 to/from the mixed-data protocol, referred to herein as "Layer 1M" and "Layer 2M". For the downlink functions of the translator block 250, the conventional downlink deframer (DFR DL) 212 extracts I,Q data from conventional CPRI frames and the downlink mixed-data framer (MFR DL) 216 combines the I,Q data and Ethernet data to form mixed-data frames. For the uplink functions of the translator block 250, the uplink mixed-data deframer (MDFR UL) 220 separates the I,Q data and the Ethernet data in the mixed-data frames and the uplink conventional framer (FR UL) 222 restores the conventional protocols of Layer 1 and Layer 2 for communications with the REC 22 and the Ethernet switch 200. The communication between the gateway 204 and the RE 208 uses the mixed-data protocols of Layer 1M and Layer 2M for both the uplink and the downlink directions. At the RE 208 for the downlink, the mixed-data deframer (MDFR) 320 extracts the I,Q data from the mixed-data frames for the air interface and extracts the Ethernet data from the mixed-data frames for the LAN segment. At the RE 208 for the uplink, the mixed-data framer (MFR) 316 combines the I,Q data received from the air interface and the Ethernet data received from the LAN segment to form mixed-data frames for transfer to the gateway 204.

Figure 19:
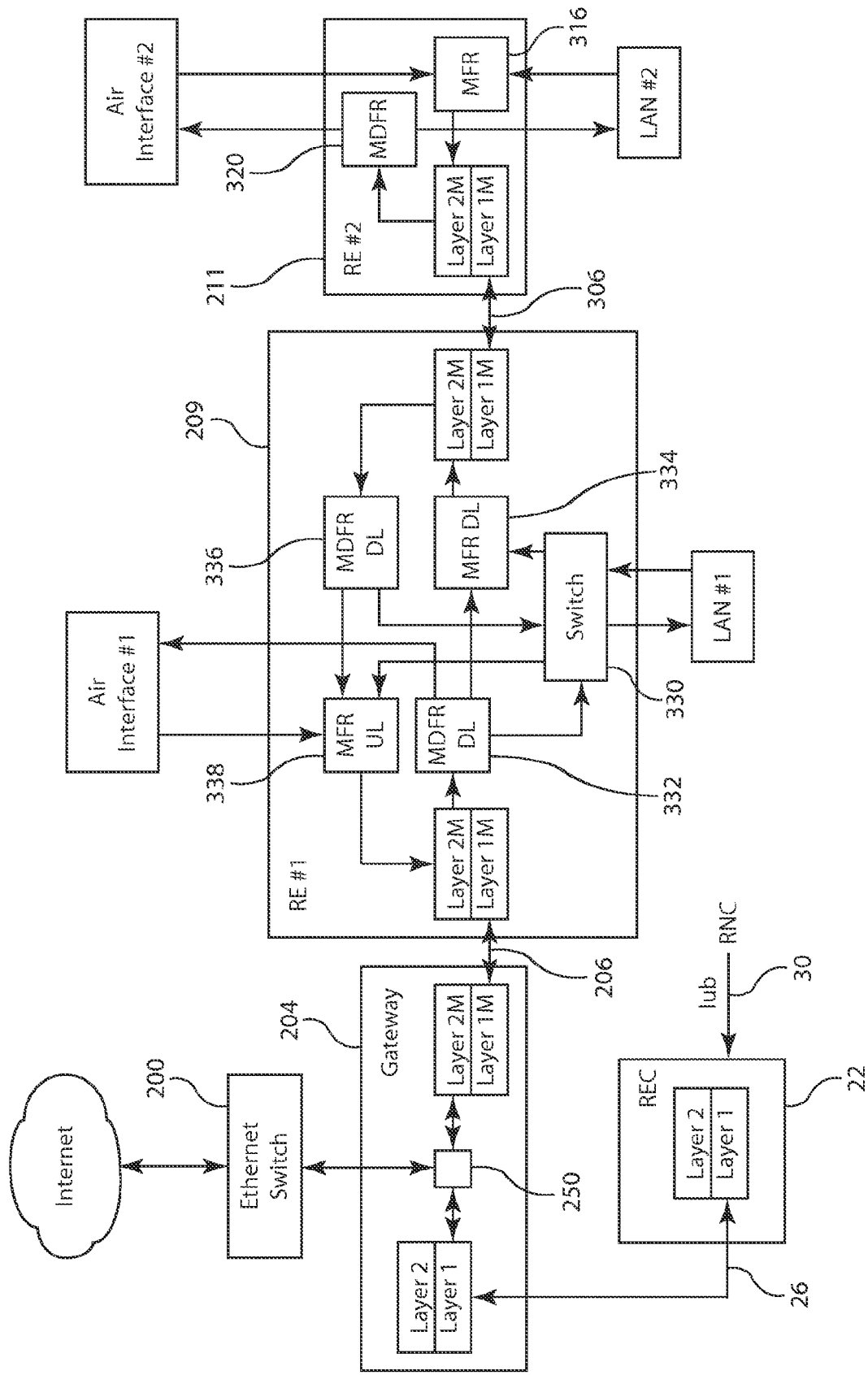
FIG. 19 illustrates an example of communication between the REC, gateway and two REs connected in a chain topology.

For a DAS topology where there are cascaded REs (i.e. FIGS. 4, 5 and 6) or when multiple LAN segments connected to one RE, switching logic at an intermediate RE may route the Ethernet packets to the appropriate LAN segment or to the next connected RE. FIG. 19 illustrates an example of communication between REC 22, gateway 204 and two REs 209 and 211 connected in a chain topology. Each of the REs 209 and 211 has an air interface and an associated LAN segment. The communication functions of REC 22 and gateway 204 (including translator block 250) perform as described with respect to FIG. 18. The communication functions of the RE 211 are as described for the RE 208 in FIG. 18, except that RE 211 is connected to the intermediate RE 209 instead of the gateway 204. The intermediate RE 209 receives and transmits mixed-data frames having I,Q data and Ethernet data with the gateway 204 via the data transfer interface 206 and with the second RE 208 via a second data transfer interface 306 using the Layer 1M and Layer 2M protocols described above. The intermediate RE 209 includes switching logic 330 to direct the Ethernet data to the appropriate destinations. For the downlink at the intermediate RE 209, the downlink mixed-data framer (MDFR DL) 332 extracts the I,Q data and the Ethernet data from the mixed-data frames received from the gateway 204. The switching logic 330 uses the destination address information to direct the Ethernet data received from the MDFR DL 332 to the LAN segment LAN#1 or to the downlink mixed-data framer 334. For Ethernet data received from the LAN#1 segment, the switching logic 330 directs these Ethernet data to the downlink mixed-data framer (MFR DL) 334 or to the uplink mixed-data framer (MFR UL) 338 based on the Ethernet address information. For the downlink to RE 208, the MFR DL 334 combines the I,Q data received from the MDFR DL 332 and the Ethernet data received via the switching logic 330 to form mixed-data frames. The mixed-data frames are transmitted via the data transfer interface 306 to the second RE 208. At the RE 208, the MDFR 320 separates the I,Q data and Ethernet data and provides the Ethernet data to the LAN#2 segment and the I,Q data to the air interface #2. For the uplink at the intermediate RE 209, the MDFR UL 336 separates the I,Q data and the Ethernet data received from the RE 208. The switching logic 330 directs the Ethernet data received from the MDFR UL 336 to the LAN#1 segment or to the MFR UL 338 based the Ethernet address information. The MFR UL 338 combines the I,Q data received from the MDFR UL 336 and the Ethernet data received via the switching logic 330 to form mixed-data frames for transfer to the gateway 204. At the gateway 204, the translator block 250 provides the Ethernet data to the Ethernet switch 200 and the I,Q data to the REC 22.

Figure 20:
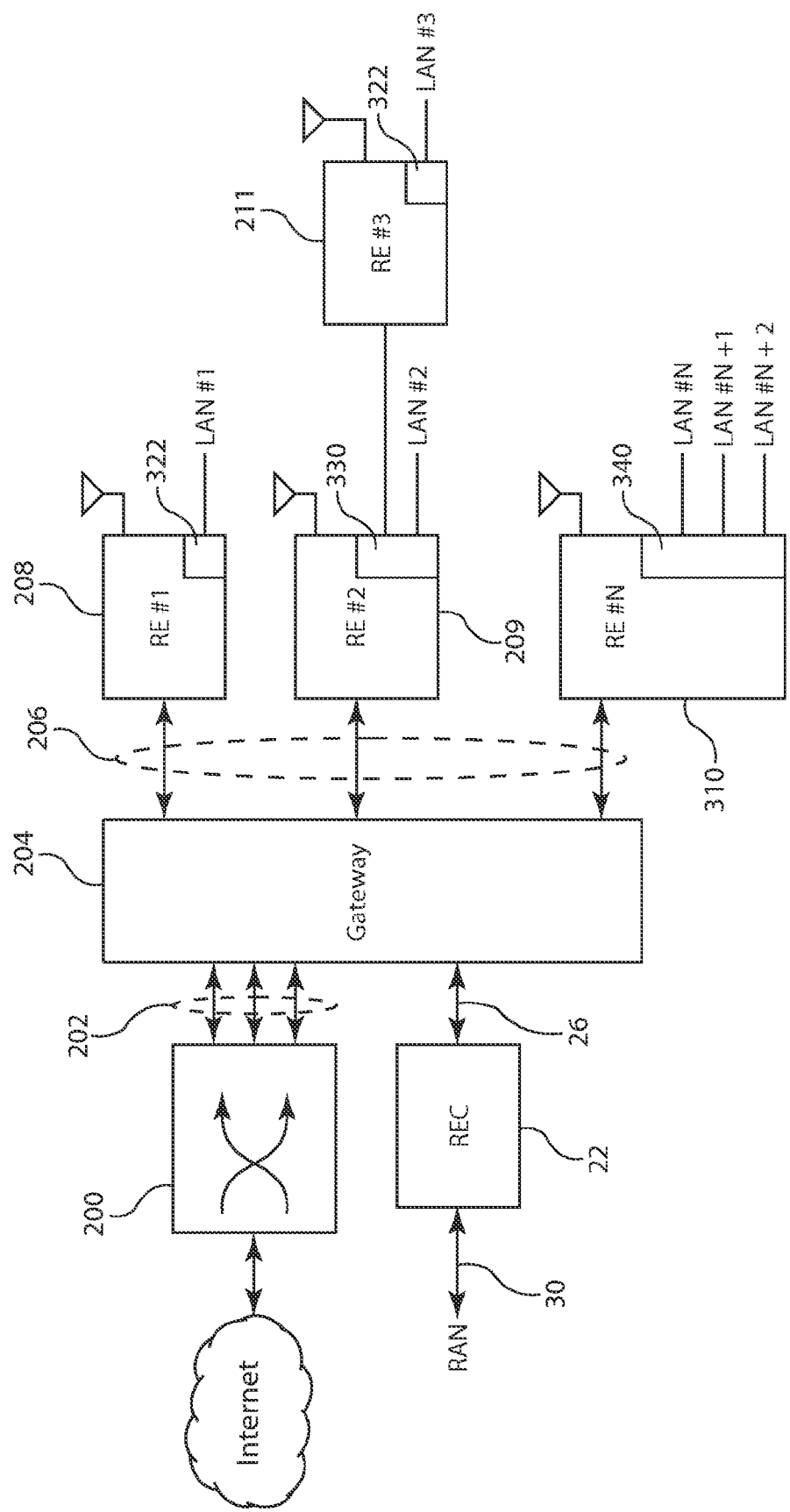
FIG. 20 illustrates an example of a DAS topology having cascaded REs and multiple LAN segments.

FIG. 20 illustrates an example of a DAS topology having cascaded REs and multiple LAN segments. The RE 208 communicates with the gateway 204, as described with respect to FIG. 18. The REs 209 and 211 communicate as described with respect to FIG. 19. The RE 310 includes switching logic 340 to direct the Ethernet data among the multiple LAN segments. The switching logic 340 directs the Ethernet data retrieved from mixed-data frames to the appropriate LAN segment based on the Ethernet address information. The REs 209 and 310 each include an Ethernet frame reconstructor 326 and Ethernet frame preprocessor 318, as described with respect to FIG. 17. For the downlink, the switching logic 330 and 340 may receive reconstructed Ethernet frames destined for the corresponding LAN segments from respective Ethernet frame reconstructors 326. For the uplink, the switching logic 330 and 340 may provide Ethernet frames received from the corresponding LAN segments to respective Ethernet frame preprocessors 318.

Compression of the I,Q signal samples can increase the capacity of the data transfer interfaces 206 and 306 to carry more data from the antenna-carrier sources as well as from the LAN sources and Internet sources. The increased data transfer capacity can allow the 1000Base-T links, for example, to carry data in compressed form at a rate that is effectively greater than 1 Gbps. The commonly owned US patent application, application Ser. No. 12/124,832, entitled "Compression of Baseband Signals in Base Transceiver Systems," filed May 21, 2008, describes algorithms for compression and decompression of baseband I,Q signal samples in base transceiver systems. The compression methods described herein adapt those algorithms for compressing I,Q signal samples for mixed-data frames.

Figure 21:
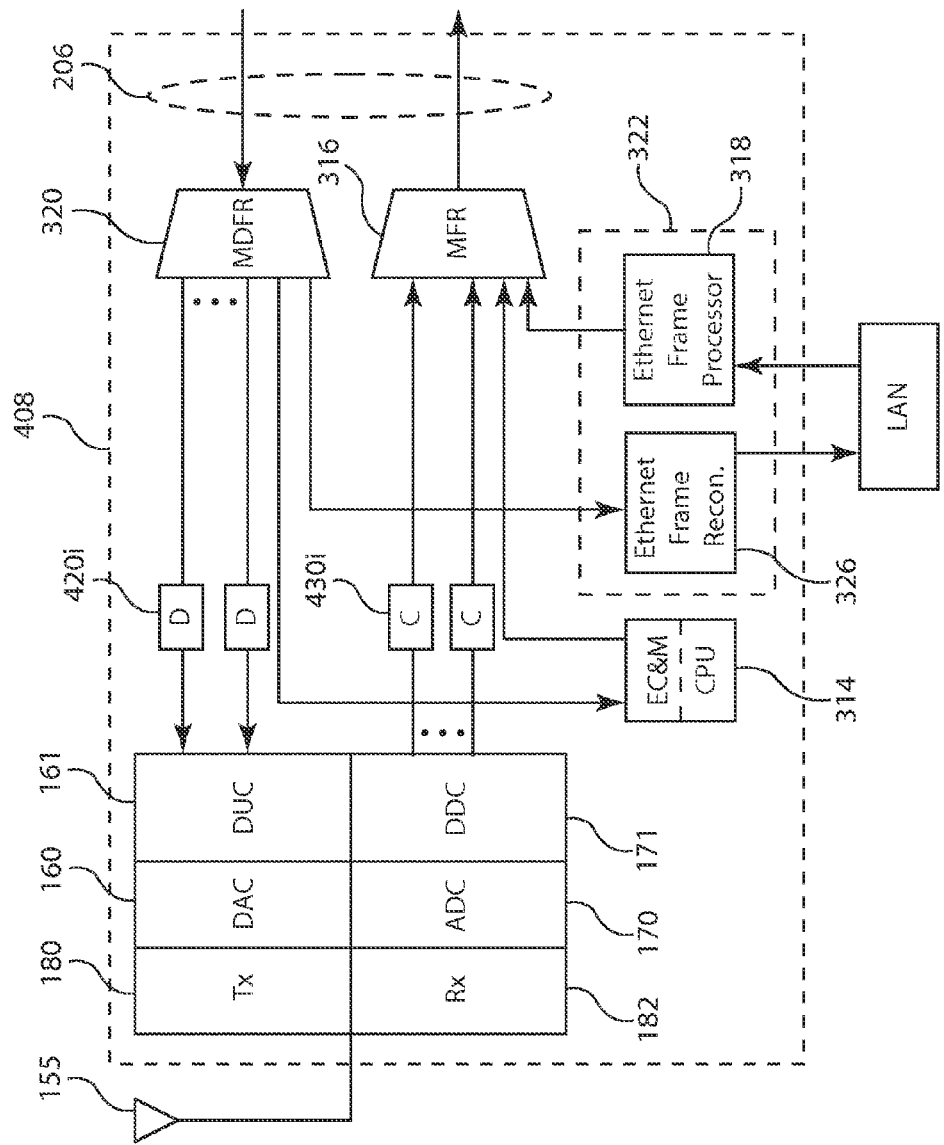
FIG. 21 is a block diagram of a RE that applies compression and decompression to the baseband I,Q signal samples, in accordance with a preferred embodiment.

FIG. 21 is a block diagram of a RE that applies compression and decompression to the baseband I,Q signal samples, in accordance with a preferred embodiment. For the downlink or transmit path, the RE 408 receives mixed-data frames having compressed I,Q data in AxC containers for corresponding antenna-carriers and Ethernet data for the LAN segment in corresponding AxC containers. The mixed-data deframer 320 separates the compressed I,Q data of corresponding antenna-carriers and the Ethernet data based on the AxC container assignments as described with respect to FIG. 17. Each decompressor 420$i$ decompresses the compressed samples of the corresponding antenna-carrier to reconstruct the baseband I,Q signal samples. The digital upconverter (DUC) 161, DAC 160 and Tx 180 apply the conventional sequence of operations to the decompressed I,Q signal samples for transmission via the antenna 155, as described with respect to FIG. 12. For the uplink or receive path, the receiver 182 receives the RF signal and the ADC 170 digitizes the received signal to produce a digital signal that represents channelized signal data. The digital downconverter (DDC) 171 downconverts each channel to form baseband I,Q signal samples of the corresponding antenna-carrier. The compressor 430$i$ compresses the baseband I,Q signal samples to produce compressed I,Q signal samples. The compressor 430$i$ may form compressed data packets containing a number of compressed I,Q signal samples and an optional compression header. The compression header may contain compression parameters or other information useful for decompressing the compressed I,Q signal samples in one or more compressed data packets. The mixed-data framer 316 maps the compressed data packets to AxC containers provisioned for I,Q data. The mixed-data framer 316 multiplexes the AxC containers having compressed I,Q data and the AxC containers having the Ethernet data and inserts the EC&M data in the control words to form mixed-data frames.

Figure 22:
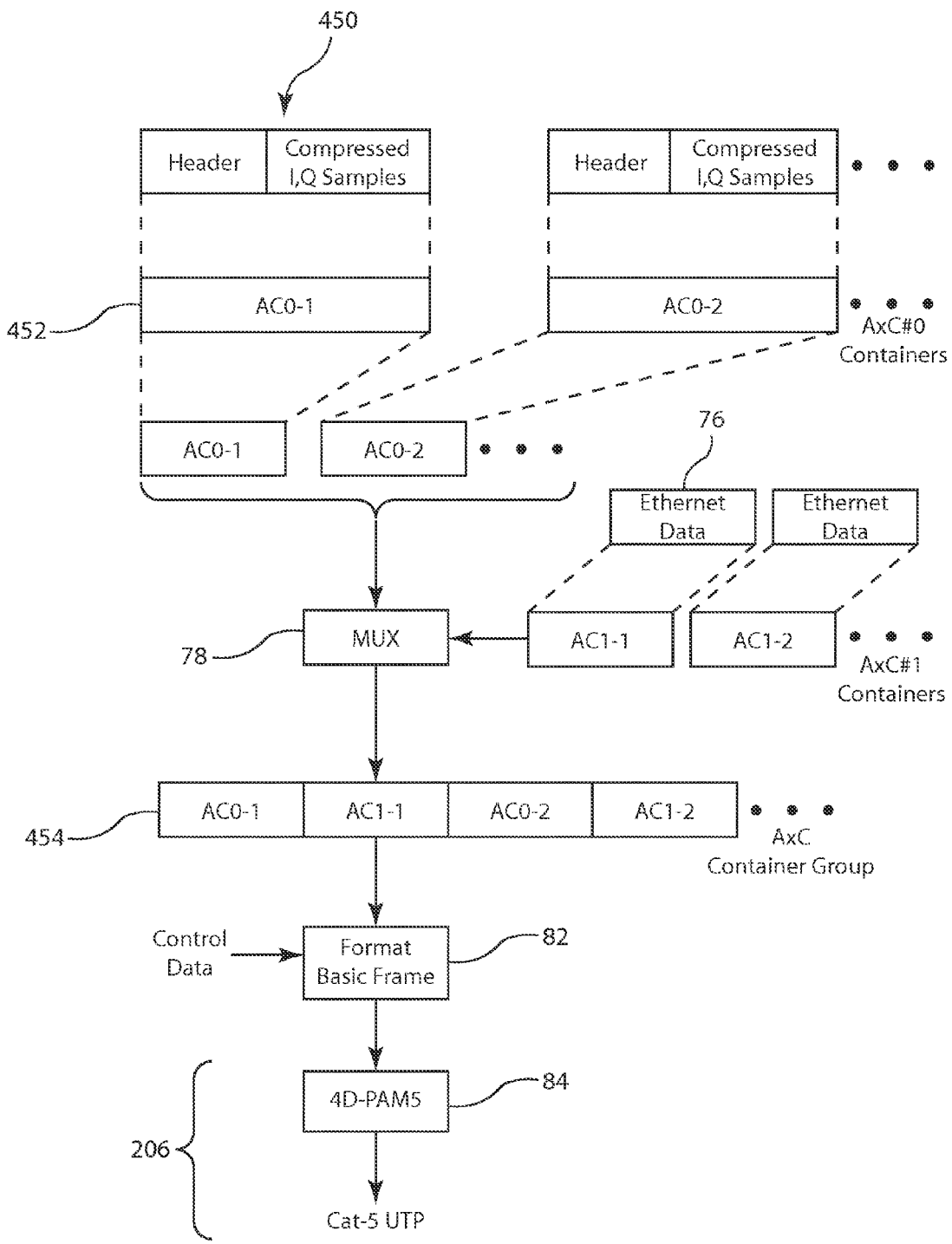
FIG. 22 illustrates an example of mapping compressed I,Q data and Ethernet data by the mixed-data framer.

FIG. 22 illustrates an example of mapping compressed I,Q data and Ethernet data by the mixed-data framer 316. The compressed data packet 450 includes the compressed I,Q signal samples and an optional compression header. The mixed-data framer 316 maps the compressed data packets 450 to the set of AxC containers AC0-1 and AC0-2 and the Ethernet data 76 to the set of AxC containers AC 1-1 and AC 1-2. The multiplexer 78 interleaves the AxC containers to form the AxC container group 454. The basic frame formatter 82 forms the mixed-data frame. The 4D-PAM5 encoder 84 encodes the mixed-data frames for transmission as described with respect to FIG. 15.

Figure 23:
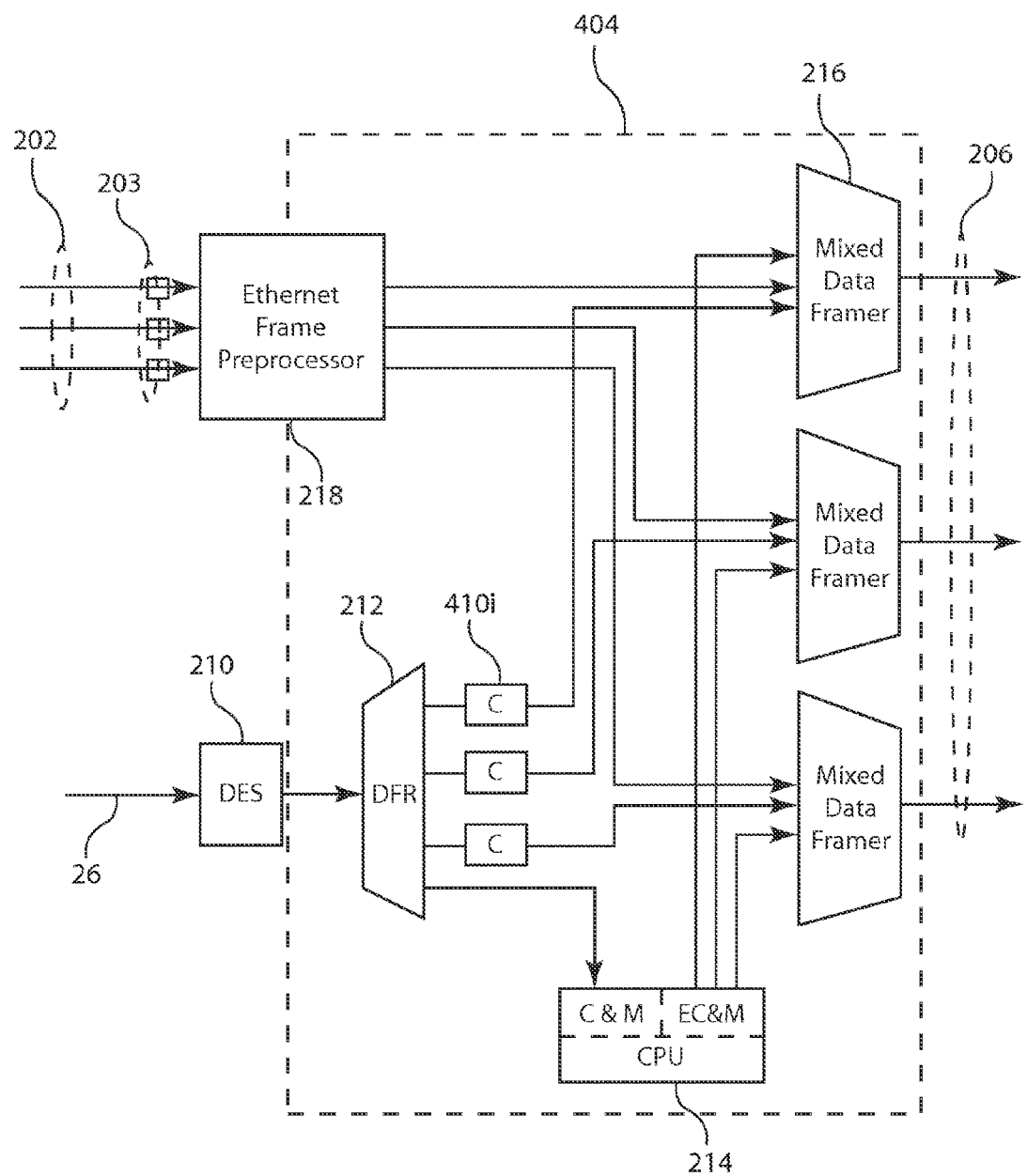
FIG. 23 illustrates an example of a gateway that includes compression in the downlink functions.

In alternative architectures, the gateway or the REC may provide compression of I,Q signal samples for transfer to the RE 408 and decompression of compressed I,Q signal samples received from the RE 408. FIG. 23 illustrates an example of a gateway 404 that includes compression in the downlink functions. In this example, the REC 22 has performed the conventional operations to provide the baseband I,Q signal samples to the gateway 404 in the format described with respect to FIG. 11. The deframer 212 extracts the I,Q data from the AxC containers of corresponding antenna-carriers destined for the different REs 408, as described with respect to FIG. 14. The deframer 212 provides the I,Q signal samples destined for the RE 408 to the compressor 410$i$. The compressor 410$i$ compresses of I,Q signal samples of corresponding antenna-carriers for the RE 408 to form compressed I,Q data packets. The mixed-data framer 216 maps the compressed I,Q data and Ethernet data to respective AxC containers and formats the basic frames as described with respect to FIG. 22. The mixed-data frames are transmitted to the RE 408 via the data transfer interface 206. At the RE 408, the mixed-data deframer 320 separates the compressed I,Q data and the Ethernet data. The decompressors 420$i$ reconstruct the baseband I,Q signal samples of the corresponding antenna-carriers, as described with respect to FIG. 21.

Figure 24:
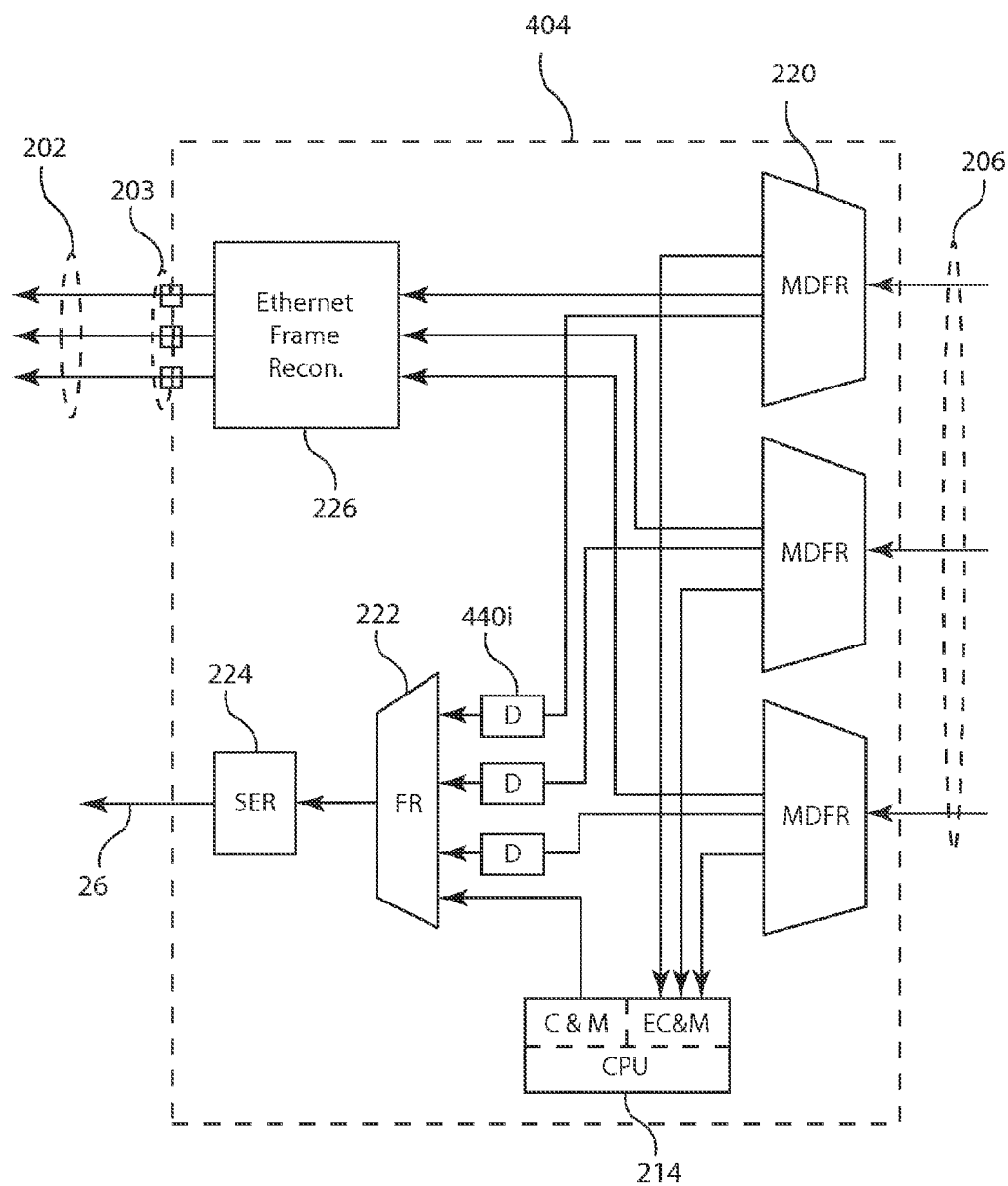
FIG. 24 illustrates an example of a gateway that includes decompression in the uplink communication functions.

FIG. 24 illustrates an example of the gateway 404 that includes decompression in the uplink communication functions. The gateway 404 receives mixed-data frames having compressed I,Q data and Ethernet data in respective AxC containers provided by the REs 408. Each mixed-data deframer (MDFR) 220 separates the compressed I,Q data and the Ethernet data as described with respect to FIG. 16. The MDFR 220 provides the compressed I,Q data packets of one or more corresponding antenna-carriers to each decompressor 440$i$. The decompressor 440$i$ decompresses the compressed I,Q signal samples of the corresponding antenna-carriers to produce corresponding streams of decompressed I,Q signal samples to the framer 222. The framer 222 formats the decompressed I,Q signal samples of corresponding antenna-carriers along with the C&M data to produce conventional CPRI basic frames, as described with respect to FIG. 11. The serializer (SER) 224 performs 8b/10b encoding for transferring the CPRI frames via the serial data link 26 to the REC 22.

Figure 25:
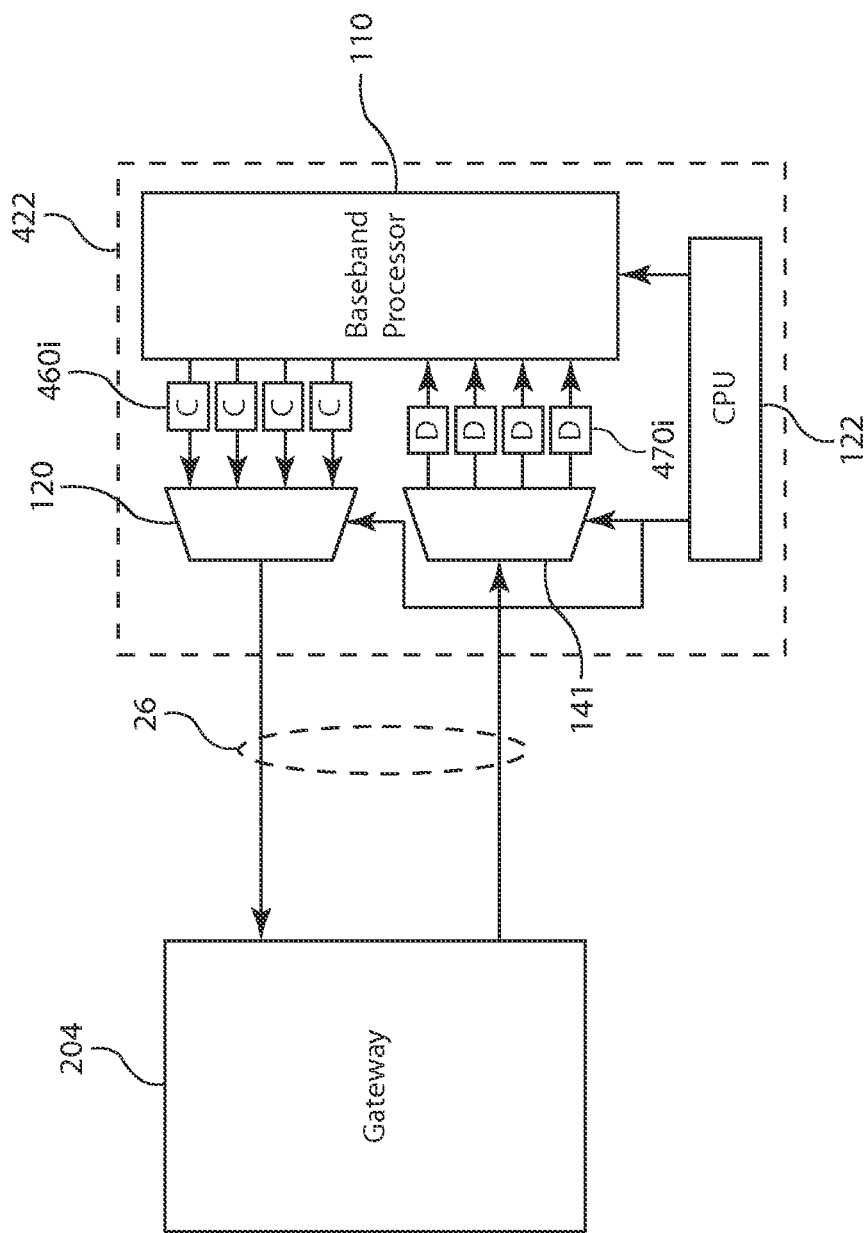
FIG. 25 is an example of a REC that includes compression and decompression.

FIG. 25 is an example of a REC 422 that includes compression and decompression of baseband I,Q signal samples. For this architecture, the gateway 204 operates as described with respect to FIGS. 14 and 16, except that the AxC containers carry compressed I,Q data instead of uncompressed I,Q data. In the example of FIG. 25, there are four channels of baseband I,Q signal samples representing four antenna-carriers. For the downlink or transmit path, each compressor 460$i$ in the REC 422 compresses a stream of baseband I,Q signal samples provided by the baseband processor 110 to form compressed I,Q signal samples. The compressor 460$i$ may format the compressed I,Q signal samples into compressed data packets having a compression header, as described above. The multiplexer 120 multiplexes the compressed data packets from the compressors 460$i$ into a serial data stream for transfer over the serial data link 26 to the gateway 204. In a preferred embodiment, the multiplexer 120 maps the compressed data packets in accordance with the CPRI specification.

Figure 26:
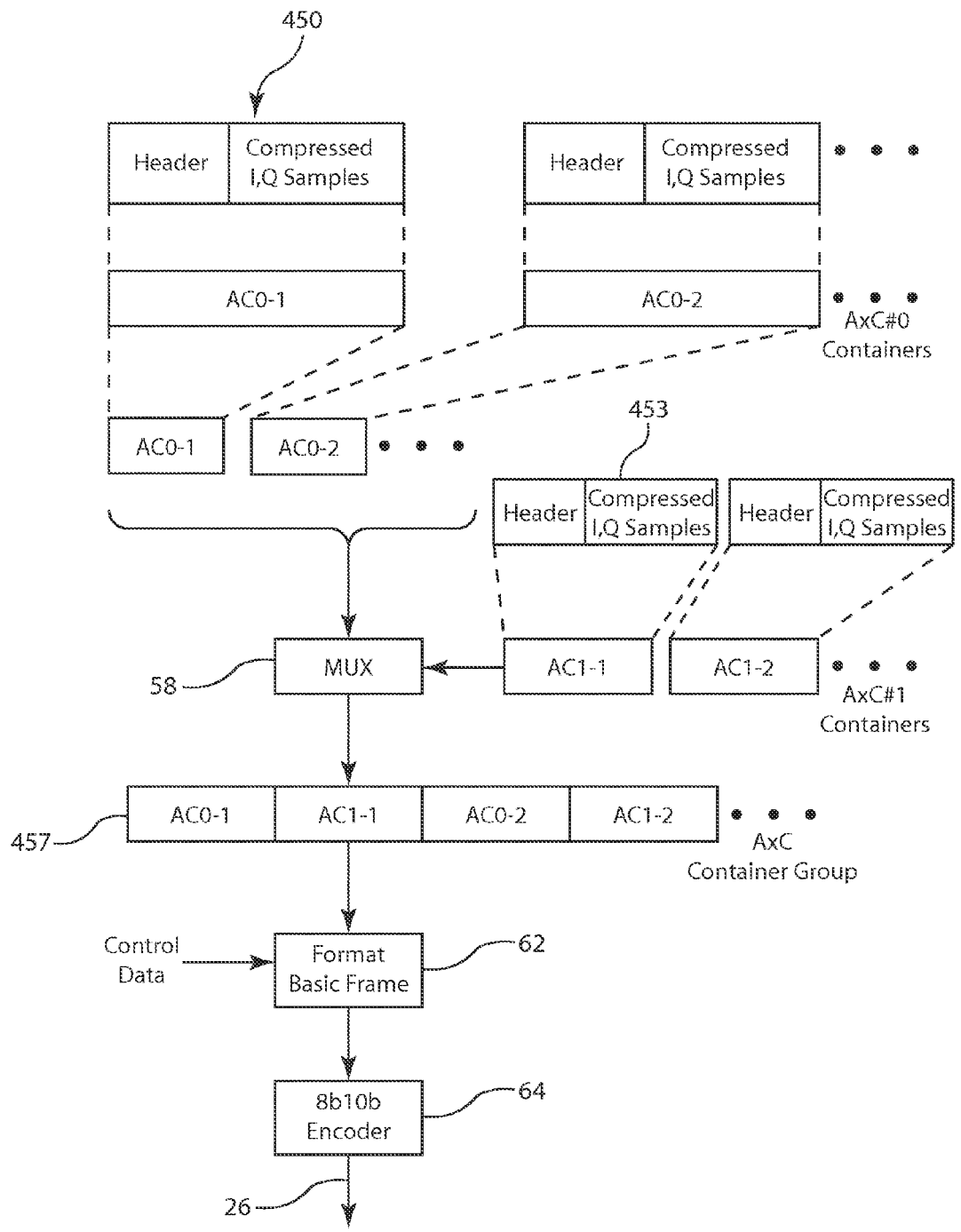
FIG. 26 illustrates the mapping and multiplexing of the compressed data packets.

FIG. 26 illustrates the mapping and multiplexing of the compressed data packets. Compressed data packets 450 corresponding to antenna-carrier AxC#0 are mapped to the set of AxC containers AC0-1 and AC0-2. Compressed data packets 453 corresponding to antenna-carrier AxC#1 are mapped to the set of AxC containers AC1-1 and AC1-2. The multiplexer 58 interleaves the AxC containers to form the AxC container group 457. The basic frame formatter 62 produces conventional CPRI basic frames having compressed I,Q signal samples in the AxC containers instead of uncompressed I,Q signal samples. The 8b/10b encoder 64 encodes the basic frames for transfer over the serial data link 26 to the gateway 204. The gateway 204 performs the operations described with respect to FIG. 14 to reframe the compressed I,Q signal samples in mixed-data frames for transfer to respective REs 408.

Returning to FIG. 25, for the uplink or receive path, gateway 204 receives compressed I,Q data in the AxC containers of mixed-data frames from the REs 208. The gateway 204 reframes the compressed I,Q signal samples of the mixed-data frames into conventional frames for transfer to the REC 422. At the REC 422, the demultiplexer 141 demultiplexes the AxC containers to provide streams of compressed I,Q data packets of corresponding antenna-carriers to respective decompressors 470i. Each decompressor 470i reconstructs the corresponding I,Q signal samples prior to the normal operations by the baseband processor 110.

The compressors 410i, 430i and 460i may organize the compressed samples into compressed data packets compatible with the CPRI, OBSAI or another protocol. The compressed data packets represent compressed I and Q samples. The order of the compressed samples may be sequential interlaced compressed I and Q samples, i.e. $(I_1 Q_1 I_2 Q_2 \ldots I_N Q_N)$. Alternatively, the order of the compressed I and Q samples may have blocks of compressed I samples followed by blocks of compressed Q samples, i.e. $(I_1 I_2 \ldots I_N Q_1 Q_2 \ldots Q_N)$. The compressors 410i, 430i and 460i operate on blocks of consecutive I,Q signal samples of a corresponding AxC having a length of BLOCK_SIZE to form a compressed data packet.

A useful BLOCK_SIZE is 192, although other block sizes can be used. The block size of 192 samples provides for simple double-buffered input blocks for field programmable gate arrays (FPGA). A smaller block size, such as 4 to 8 samples, can be implemented to meet the more stringent latency requirements of the CPRI or OBSAI specification. To meet a latency specification, the block size in samples should span a time period that is less than or equal to half the allowable latency period. This assumes that half of the latency is consumed for compression and the other half for decompression. For example, the CPRI specification indicates an allowable latency period of 5 μsec. For the UTRA-FDD signal format having one sample per chip at a chip rate of 3.84 MHz, the allowable latency of 5 μsec. spans about 19 sample intervals. A block size of 4 samples will have a latency period of 8 sample intervals which is well within the allowable latency period for CPRI.

The compressors 410i, 430i and 460i may include a compression header in one or more of the compressed data packets. The compression header portion has a defined length, for instance 16 bits. Alternatively, the compression header information can placed in overhead fields of the CPRI, OBSAI or other protocol. In an alternative for CPRI, compression header information can be encoded in stuffing bits of the basic frame. In an alternative for OBSAI, compression header information can be encoded using unused codes of an OBSAI message's TYPE field. The decompressors 420i, 440i and 470i use the compression header information to determine control parameters for decompression and to establish compressed data packet synchronization. The decompressors 420i, 440i and 470i reconstruct the sequence of I,Q signal samples in the I and Q sample order, byte order and data format specified by the CPRI, OBSAI or other protocol. Control words or messages used by CPRI, OBSAI or other protocol are not compressed.

When the baseband signals are oversampled, compression reduces the redundancy and improves data transfer efficiency. Oversampling is indicated when the number of samples per symbol or chip is greater than one. The oversampling ratio is the ratio of the sample rate to the symbol rate or chip rate. When the oversampling ratio is greater than one, the signal is oversampled. For example, the CPRI standard specifies sampling the received analog signal with an oversampling ratio 2 or 4 samples per chip for the UTRA/FDD uplink.

In many cases, lossy compression can be applied to the signal samples while maintaining system quality metrics. For lossless compression, the decompressed signal samples are identical to the original signal samples. For lossy compression, the decompressed signal samples are approximations of the original signal samples. System quality metrics typically include composite error vector magnitude (cEVM), peak code domain error (PCDE), spectral emissions mask (SEM), adjacent channel leakage ratio (ALCR), bit error rate (BER) and block error rate (BLER). The oversampling and/or sample widths of the signal samples may be greater than necessary to meet system requirements for signal quality. Lossy compression can provide a greater reduction in data transfer capacity while the important metrics of signal quality are preserved.

Alternatives for compression applicable to baseband I,Q signal samples include block floating point encoding and computing first or higher order derivatives of the signal samples followed by block floating point encoding. Huffman or other types of encoding can be alternatives to block floating point encoding. For signal samples that are sampled at one sample per chip or symbol, the preferred method is block floating point encoding of the signal samples. The block floating point encoding is applied to the I samples and, independently, to the Q samples, to form the compressed samples.

The preferred block floating point encoding has the following steps for BLOCK_SIZE samples, each BLOCK_SIZE divided into groups of N_group samples, where S is the original number of bits per sample:

For the first group of samples:
1) Determine the exponent (base 2) for the sample with the maximum magnitude, such as by calculating the $\log_2$ of the maximum magnitude. This indicates the number of bits per encoded sample in the group, or n_exp(0).
2) Absolute encode the exponent n_exp(0) of the first group using S bits.
3) Encode the N_group samples using n_exp(0) bits per sample.
4) For the $i^{th}$ group of N_group samples
5) Determine the $i^{th}$ exponent (base 2) for the sample with the maximum magnitude, which indicates the number of bits per encoded sample in the $i^{th}$ group, or n_exp(i);
6) Differentially encode the $i^{th}$ exponent by subtracting n_exp(i) from n_exp (i−1) to determine the first token in the $i^{th}$ group of encoded samples.
7) Encode the $i^{th}$ group of N_group samples using n_exp(i) bits per sample.

For the first group of samples in the BLOCK_SIZE samples, the exponent n_exp(0) is absolute encoded. For example, the exponent n_exp(0) can be encoded as follows, where S is the original number of bits per sample:

| | |
|---|---|
| a) 0: | n_exp(0) = 0 (all 4 sample values are zero) |
| b) 1: | n_exp(0) = 2 (2 bits per sample) |
| c) 2: | n_exp(0) = 3 (3 bits per sample) |
| d) etc. until S − 1: | n_exp(0) = S (S bits per sample) |

For the $i^{th}$ group, the exponent n_exp(i) is differentially encoded using a prefix code, where no codeword is the prefix of another codeword. The preferred differential encoding is as follows:

1) Calculate difference: e_diff=n_exp(i)−n_exp(i−1)
2) Encode e_diff as follows:

| | |
|---|---|
| a) 0: | e_diff = e(i) − e(i − 1) |
| b) 101: | e_diff = +1 |
| c) 110: | e_diff = −1 |
| d) 1001: | e_diff = +2 |
| e) 1110: | e_diff = −2 |
| f) etc. | |

Another compression alternative for baseband signal samples is calculating differences followed by encoding. Calculating first or higher order differences of the signal samples can result in difference samples having smaller magnitudes than the original signal samples. Encoding the difference samples can result in greater compression than encoding the samples themselves. Calculating the differences of consecutive samples in each BLOCK_SIZE number of samples is followed by block floating point encoding of the difference samples, as described above. Alternatively, Huffman encoding or other encoding can be applied to the difference samples.

Compression can also include reducing the amplitudes of signal samples. This is a form of lossy compression. Attenuating the signal samples by an attenuation factor reduces the effective sample width. The attenuated signal samples can be encoded by block floating point or other encoding. Alternatively, the first or higher order differences of the attenuated signal samples can be calculated prior to encoding. For decompression, the amplitudes of the decompressed samples can be increased by the inverse of the attenuation to restore the original sample width.

The optimum compression for the I,Q signal samples that meets system quality requirements for the DAS can be determined in advance by the system operator. The compression control parameters for the various types of signals can be determined by testing alternatives on simulated or actual I,Q signal samples. Compression control parameters may be based on the modulation type, sample rate (or oversampling ratio), bandwidth and sample width. Compression control parameters may select lossless or lossy compression. For instance, selecting an attenuation parameter for reducing the amplitudes of the signal samples will result in lossy compression.

Figure 27:
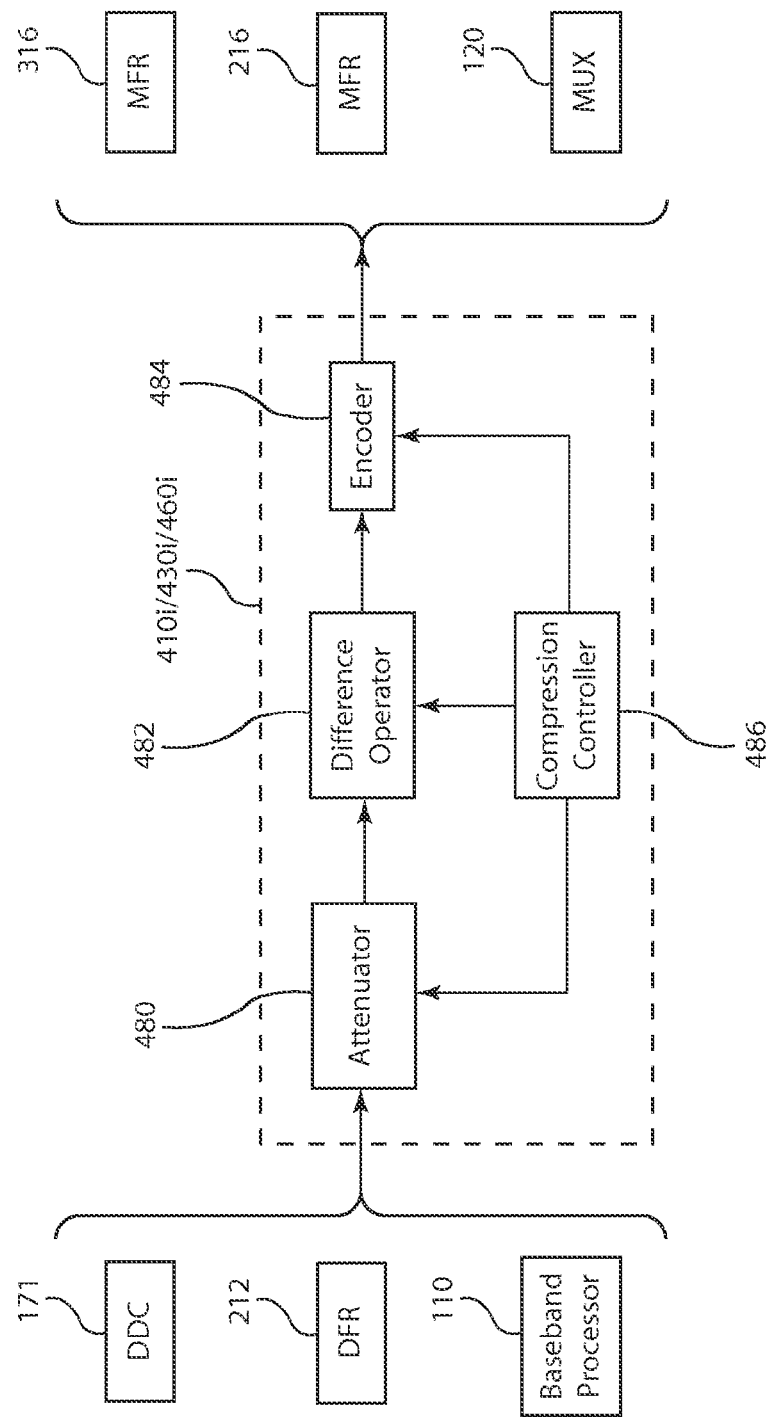
FIG. 27 shows a block diagram of an embodiment of the compressors for the RE, gateway or REC.

FIG. 27 shows a block diagram of an embodiment of the compressors 410i, 430i or 460i for the RE 408, gateway 404 or REC 422, respectively. The input signal samples are provided by the DDC 171, the DFR 212 or the baseband processor 110 to the compressor 410i/430i/460i. For lossy compression, the attenuator 480 reduces the amplitudes of the signal samples by an attenuation factor that may be provided by the compression controller 486. The difference operator 482 calculates first differences or higher order differences of the attenuated signal samples. Alternatively, for lossless compression, the difference operator 482 may be applied directly to the input signal samples, bypassing the attenuator 480. The encoder 484 may perform block floating point encoding or other encoding as described above. The encoder 484 packs the compressed samples along with compression header information to form compressed data packets provided to the mixed-data framers (MFR) 316/216 or mux 120. The compression controller 486 provides control parameters for the attenuator 480, difference operator 482 and encoder 484. The control parameters for the difference operator 482 can select first, second or higher order differences, or bypass the difference operations. The control parameter for the encoder 484 can indicate parameters for the block floating point encoder, such as the initial number of bits per sample S, the group size and BLOCK_SIZE. The compression controller 486 may calculate compression control parameters based on information provided by the system operator or the compression control parameters may be input to the compression controller 486. The compression controller operations may be implemented in the CPUs 314, 214 or 122 of the RE 408, gateway 404 or REC 422, respectively.

Figure 28:
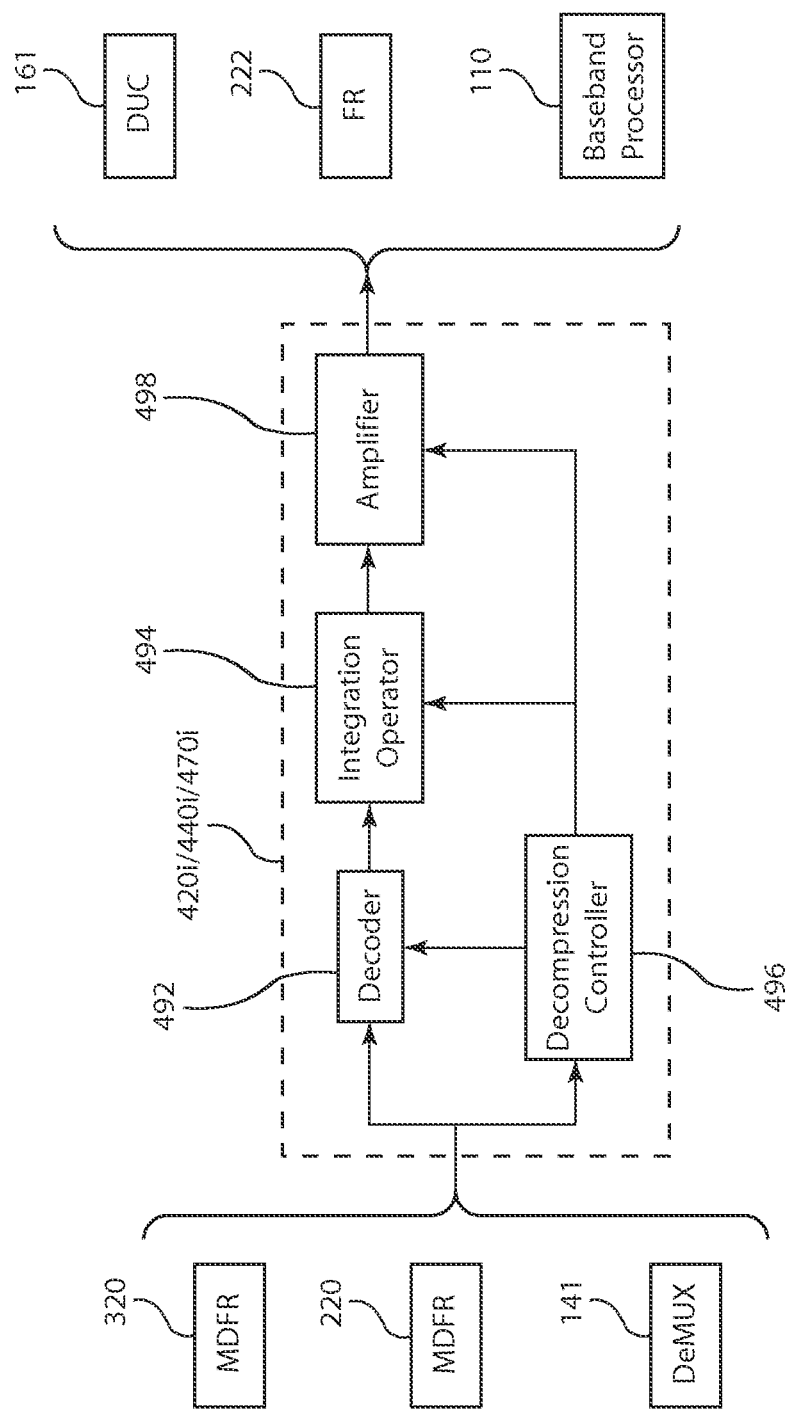
FIG. 28 shows a block diagram of an embodiment of the decompressor for the RE, gateway or REC.

FIG. 28 shows a block diagram of an embodiment of the decompressors 410i, 430i or 470i for the RE 408, gateway 404 or REC 422, respectively. The decoder 492 inverts the operations of the encoder 482 to form decoded samples. For example, the decoder 492 performs block floating point decoding, Huffman decoding or other decoding. The integration operator 494 adds the decoded difference samples to invert the first or higher order differencing performed for compression. If differencing was not performed for compression, the integration operator 494 would be bypassed. The amplifier 498 increases the amplitudes of the decompressed samples by the inverse of the attenuation factor to restore the original sample width. If the attenuation was not performed for compression, the amplifier 498 would be bypassed. The decompression controller 496 provides control parameters to the decoder 492, integration operator 494 and amplifier 498. The decompression controller 496 can extract control information from the header of the compressed data packet to determine the control parameters.

The gateway 204 may be implemented using a modular architecture, including modules for the mixed-data framer 216, mixed-data deframer 220, CPU 214, serializer 224, deserializer 210, framer 222, deframer 212, Ethernet frame preprocessor 218 and Ethernet frame reconstructor 226. The gateway 404 includes modules for compressors 410i and decompressors 440i in addition to the modules of gateway 204. These modules may be implemented using one or more programmable processors, application specific integrated circuits (ASIC), a system-on-chip (SoC) architecture or a combination of these with supporting memory logically and/or physically configured for framing and buffering the data being processed. Programmable processors include software/firmware programmable processors such as computers, digital signal processors (DSP), microprocessors (including microcontrollers) and other programmable devices, and hardware programmable devices such as complex programmable logic devices (CPLD), field programmable gate arrays (FPGA) or programmable array logic. Depending on the type of programmable processor, the program implementing the module's operations are represented by software, firmware, netlist, bitstream or other type of processor executable instructions and data. The modules for the conventional radio data interface functions, such as the serializer 224, deserializer 210, framer 222 and deframer 212 are commercially available as intellectual property (IP) cores for FPGA, ASIC and SoC architectures.

The REs 208, 209, 211 and 310 may also be implemented using a modular architecture, including modules for the mixed-data framer 316, mixed-data deframer 320, CPU 314, Ethernet frame preprocessor 218 and Ethernet frame reconstructor 226, as described for the gateway 204. The RE 408 includes modules for compressors 430i and decompressors 420i in addition to the modules of REs 208, 209, 211 and 310, as described for the gateway 404. These modules may be interfaced with the modules implementing the conventional digital processing functions of the DUC 161 or DDC 171, as described with respect to FIGS. 17 and 21. Modules for the conventional DUC 161 and DDC 171 are commercially available as intellectual property (IP) cores for FPGA, ASIC and SoC architectures. Implementations of compression or decompression can be performed in real time, that is, at least as fast as the sample rate of the ADC or DAC.

While the preferred embodiments of the invention have been illustrated and described, it will be clear that the invention is not limited to these embodiments only. Numerous modifications, changes, variations, substitutions and equivalents will be apparent to those skilled in the art, without departing from the spirit and scope of the invention, as described in the claims.

We claim:

1. In a distributed antenna system (DAS) that includes at least one radio equipment (RE), a method of data distribution in the DAS and a local area network (LAN) in proximity with the DAS, wherein the data include signal samples from a radio equipment controller (REC) and data packets from a switch, wherein the data packets are destined for one or more LAN segments of the LAN, wherein each data packet contains a plurality of data bits organized in accordance with a LAN protocol used by the LAN, the data packet including an address information associated with a destination device of a corresponding LAN segment, wherein each signal sample corresponds to an antenna-carrier, each RE including a digital upconverter (DUC) and a digital to analog converter (DAC) to process the signal samples of one or more antenna-carriers for transmission via an antenna, the method comprising:
receiving one or more streams of the data packets at a gateway from the switch, wherein the stream of the data packets destined for the corresponding LAN segment are received over a given gateway port, wherein the corresponding LAN segment is coupled to communicate with a corresponding RE;
receiving the signal samples from the REC at the gateway, wherein the signal samples are organized in one or more radio data frames having a frame structure in accordance with a radio data interface protocol, the frame structure including a user data portion and a control information portion, the user data portion including a plurality of containers, wherein the containers are assigned to corresponding antenna-carriers of the corresponding RE, wherein a given container includes one or more of the signal samples of the corresponding antenna-carrier;
mapping the data packets and the signal samples for the corresponding RE to one or more mixed-data frames, the mixed-data frames having the frame structure in accordance with the radio data interface protocol, wherein a first set of containers in a user data portion of the mixed-data frame contains the data bits of the data packets for the corresponding LAN segment and a second set of containers in the user data portion of the mixed-data frame contains the signal samples of the corresponding antenna-carrier;
transmitting the mixed-data frame over a data transfer interface to the corresponding RE;
receiving the mixed-data frame at the corresponding RE;
retrieving the data bits and the signal samples from the mixed-data frame, wherein the data bits for the corresponding LAN segment are retrieved from the first set of containers in the mixed-data frame and the signal samples of the corresponding antenna-carrier are retrieved from the second set of containers in the mixed-data frame;
formatting the data bits into one or more reconstructed data packets in accordance with the LAN protocol for transmission to the corresponding LAN segment; and
providing the signal samples of the corresponding antenna-carrier to the DUC at the corresponding RE.

2. The method of claim 1, wherein said mapping the data packets and the signal samples further comprises:
mapping the data bits of the data packets to the first set of containers assigned to the corresponding LAN segment;
mapping the signal samples to the second set of containers assigned to the corresponding antenna-carrier; and
multiplexing the containers of the first set and the second set to form a sequence of multiplexed containers for the user data portion of the mixed-data frame.

3. The method of claim 2, wherein said retrieving the data bits and the signal samples from the mixed-data frame further comprises:
demultiplexing the sequence of multiplexed containers of the mixed-data frame to separate the first set of containers and the second set of containers;
retrieving the data bits from the first set of containers for said formatting the data bits; and
retrieving the signal samples from the second set of containers for said providing the signal samples to the DUC.

4. The method of claim 1, wherein said receiving one or more streams of the data packets further comprises:
extracting the data bits from the data packet for the corresponding LAN segment, wherein said receiving the signal samples further comprises:
extracting the signal samples from the set of containers of the radio data frame for the corresponding antenna-carrier.

5. The method of claim 1, wherein a plurality of LAN segments is coupled to communicate with the corresponding RE, wherein the first set of containers in the mixed-data frame comprises a first plurality of subsets, further comprising:
assigning each subset of the first plurality of subsets to a corresponding one of the plurality of LAN segments, wherein said mapping the data packets and the signal samples further comprises mapping the data bits of the data packets destined for the corresponding LAN segment to a corresponding subset in the first plurality of subsets.

6. The method of claim 1, wherein a plurality of LAN segments is coupled to communicate with the corresponding RE, further comprising:
assigning the first set of containers to the corresponding RE, wherein said mapping the data packets and the signal samples further comprises mapping the data bits of the data packets destined for the plurality of LAN segments to the first set.

7. The method of claim 6, wherein said retrieving the data bits and the signal samples from the mixed-data frame further comprises:
retrieving the data bits from the first set of containers of the mixed-data frame to a RE data buffer, wherein the RE data buffer stores the data bits for the plurality LAN segments; wherein said formatting the data bits further comprises:
mapping the data bits from the RE data buffer to the reconstructed data packet, wherein the reconstructed data packet includes the address information in accordance with the LAN protocol; and
directing the reconstructed data packet to a corresponding one of the plurality LAN segments based on the address information.

8. The method of claim 1, wherein the signal samples of a plurality of antenna-carriers are destined for the corresponding RE, wherein the second set of containers in the mixed-data frame comprises a second plurality of subsets, further comprising:
    assigning each subset of the second plurality of subsets to a corresponding one of the plurality of antenna-carriers, wherein said mapping the data packets and the signal samples further comprises mapping the signal samples of the corresponding antenna-carrier to a corresponding subset in the second plurality of subsets.

9. The method of claim 1, further comprising:
    at the gateway, compressing the signal samples to form compressed signal samples, wherein said mapping the data packet and the signal samples further comprises mapping the compressed signal samples of the corresponding antenna-carrier to the second set of containers, wherein at the RE, said retrieving the data bits and the signal samples from the mixed-data frame retrieves the compressed signal samples from the second set of containers; and
    at the RE, decompressing the compressed signal samples to form decompressed signal samples, wherein said providing the signal samples provides the decompressed signal samples to the DUC.

10. The method of claim 1, wherein the signal samples transmitted from the REC are compressed signal samples, wherein at the gateway, said receiving the signal samples receives the compressed signal samples in the radio data frame, wherein said mapping the data packets and the signal samples comprises mapping the compressed signal samples of the corresponding antenna-carrier to the second set of containers, wherein at the RE, said retrieving the data bits and the signal samples retrieves the compressed signal samples from the second set of containers, the method further comprising at the RE:
    decompressing the compressed samples to form decompressed signal samples, wherein said providing the signal samples provides the decompressed signal samples to the DUC.

11. The method of claim 1, wherein the DAS includes a first RE coupled to the gateway by the data transfer interface and a second RE coupled to the first RE by a second data transfer interface, wherein at the gateway said mapping produces the mixed-data frame further including a third set of containers and a fourth set of containers, wherein the third set of containers contains of the data bits destined for a second LAN segment in communication with the second RE and the fourth set of containers contains the signal samples destined for the second RE, wherein at the first RE said retrieving the data bits and the signal samples retrieves the data bits from the first set and the third set of containers in the mixed-data frame and the signal samples from the second set and the fourth set of containers in the mixed-data frame, the method further comprising:
    at the first RE, mapping the data bits retrieved from the third set and the signal samples retrieved from the fourth set to respective sets of containers in a second mixed-data frame; and
    transmitting the second mixed-data frame over the second data transfer interface to the second RE;
    receiving the second mixed-data frame at the second RE;
    retrieving the data bits and the signal samples from the respective sets of containers in the second mixed-data frame;
    formatting the data bits retrieved from the second mixed-data frame into corresponding reconstructed data packets in accordance with the LAN protocol for transmission to the second LAN segment; and
    providing the signal samples retrieved from the second mixed-data frame to a second DUC of the second RE.

12. The method of claim 11, further comprising:
    at the gateway, compressing the signal samples destined for the first RE and the signal samples destined for the second RE to form compressed signal samples, wherein said mapping maps the compressed signal samples to the second set and the fourth set of containers, wherein at the first RE said retrieving the data bits and the signal samples retrieves the compressed signal samples from the second set and the fourth set, said mapping at the first RE maps the compressed signal samples retrieved from the fourth set to the respective set of containers in the second mixed-data frame, wherein at the second RE, said retrieving the data bits and the signal samples from the second mixed-data frame retrieves the compressed signal samples from the respective set of containers; and
    at the second RE, decompressing the compressed signal samples retrieved from the second mixed-data frame to form decompressed signal samples, wherein said providing the signal samples retrieved from the second mixed-data frame provides the decompressed signal samples to the second DUC.

13. The method of claim 11, wherein the signal samples transmitted from the REC in the radio data frame are compressed signal samples destined for the first RE and compressed signal samples destined for the second RE, wherein at the gateway, said receiving the signal samples receives the compressed signal samples, wherein said mapping the data packets and the signal samples maps the compressed signal samples to the second set and the fourth set of containers, wherein at the first RE said retrieving the data bits and the signal samples retrieves the compressed signal samples from the second set and the fourth set, said mapping at the first RE maps the compressed signal samples retrieved from the fourth set to the respective set of containers in the second mixed-data frame, wherein at the second RE, said retrieving the data bits and the signal samples from the second mixed-data frame retrieves the compressed signal samples from the respective set of containers, the method further comprising at the second RE:
    decompressing the compressed signal samples retrieved from the second mixed-data frame to form decompressed signal samples, wherein said providing the signal samples retrieved from the second mixed-data frame provides the decompressed signal samples to the second DUC.

14. The method of claim 1, wherein a control information portion of the mixed-data frame includes an assignment information to provide the first set of containers for the data bits and the second set of containers for the signal samples of the corresponding antenna-carrier.

15. The method of claim 1, wherein the radio data interface protocol is in accordance with a Common Public Radio Interface (CPRI).

16. The method of claim 1, wherein said transmitting includes applying a 4-dimensional, 5-level pulse amplitude modulation (4D-PAM5) to the mixed-data frame.

17. In a distributed antenna system (DAS) that includes at least one radio equipment (RE), a method of data distribution in the DAS and a local area network (LAN) in proximity with the DAS, wherein the data include signal samples and data packets, wherein the data packets are transmitted from one or more LAN segments of the LAN, wherein each data packet contains a plurality of data bits organized in accordance with a LAN protocol used by the LAN, the data packet including an address information associated with a source device of a corresponding LAN segment, wherein the RE is coupled to receive an analog signal from an antenna, the RE including an analog to digital converter (ADC) applied to the analog signal and a digital downconverter (DDC) to produce the signal samples of one or more antenna-carriers, the method comprising:
- receiving the data packets from the corresponding LAN segment at a corresponding RE, wherein the corresponding LAN segment is coupled to communicate with the corresponding RE;
- mapping the data packets and the signal samples output from the DDC at the corresponding RE to one or more mixed-data frames, the mixed-data frames having a frame structure in accordance with a radio data interface protocol, the frame structure including a user data portion and a control information portion, the user data portion including a plurality of containers, wherein a first set of containers in the mixed-data frame contain the data bits of the data packets from the corresponding LAN segment and a second set of containers in the mixed-data frame contain the signal samples of a corresponding antenna-carrier;
- transmitting the mixed-data frame over a data transfer interface to a gateway;
- receiving the mixed-data frame at the gateway;
- retrieving the data bits and the signal samples from the mixed-data frame, wherein the data bits from the corresponding LAN segment are retrieved from the first set of containers in the mixed-data frame and the signal samples of the corresponding antenna-carrier are retrieved from the second set of containers in the mixed-data frame;
- formatting the data bits into one or more reconstructed data packets in accordance with the LAN protocol for transmission to a switch; and
- mapping the signal samples into one or more radio data frames in accordance with the radio data interface protocol for transfer to a radio equipment controller (REC) via a serial data link.

18. The method of claim 17, wherein said mapping the data packets and the signal samples further comprises at the RE:
- mapping the data bits of the data packets to the first set of containers assigned to the corresponding LAN segment;
- mapping the signal samples to the second set of containers assigned to the corresponding antenna-carrier; and
- multiplexing the containers of the first set and the second set to form a sequence of multiplexed containers for the user data portion of the mixed-data frame.

19. The method of claim 18, wherein said retrieving the data bits and the signal samples from the mixed-data frame further comprises at the gateway:
- demultiplexing the sequence of multiplexed containers to separate the first set of containers and the second set of containers;
- retrieving the data bits from the first set of containers for said formatting the data bits into one or more reconstructed data packets; and
- retrieving the signal samples from the second set of containers for said mapping the signal samples into one or more radio data frames.

20. The method of claim 17, wherein said receiving the data packets further comprises:
- extracting the data bits from the data packets from the corresponding LAN segment.

21. The method of claim 17, wherein a plurality of LAN segments is coupled to communicate with the corresponding RE, wherein the first set of containers in the mixed-data frame comprises a first plurality of subsets, further comprising:
- assigning each subset of the first plurality of subsets to a corresponding one of the plurality of LAN segments, wherein said mapping the data packets and the signal samples further comprises mapping the data bits of the data packets from the corresponding LAN segment to a corresponding subset in the first plurality of subsets.

22. The method of claim 17, wherein a plurality of LAN segments is coupled to communicate with the corresponding RE, further comprising:
- assigning the first set to the corresponding RE, wherein said mapping the data packets and the signal samples further comprises mapping the data bits of the data packets from the plurality of LAN segments to the first set.

23. The method of claim 22, wherein said retrieving the data bits and the signal samples from the mixed-data frame further comprises at the gateway:
- retrieving the data bits from the first set of containers of the mixed-data frame to a data buffer, wherein the data buffer stores the data bits from the plurality LAN segments; wherein said formatting the data bits into one or more reconstructed data packets further comprises:
- mapping the data bits from the data buffer to the reconstructed data packet, wherein the reconstructed data packet includes the address information in accordance with the LAN protocol; and
- directing the reconstructed data packet to a corresponding port of the gateway based on the address information.

24. The method of claim 17, wherein a plurality of antenna-carriers is processed by the corresponding RE, wherein the second set of containers in the mixed-data frame comprises a second plurality of subsets, further comprising:
- assigning each subset of the second plurality of subsets to a corresponding one of the plurality of antenna-carriers, wherein said mapping the data packets and the signal samples further comprises mapping the signal samples of the corresponding antenna-carrier to a corresponding subset in the second plurality of subsets.

25. The method of claim 17, further comprising:
- at the RE, compressing the signal samples output from the DDC to form compressed signal samples, wherein said mapping the data packets and the signal samples maps the compressed signal samples of the corresponding antenna-carrier to the second set of containers, wherein at the gateway, said retrieving the data bits and the signal samples from the mixed-data frame retrieves the compressed signal samples from the second set of containers; and further comprising at the gateway:
- decompressing the compressed signal samples to form decompressed signal samples, wherein said mapping the signal samples into one or more radio data frames maps the decompressed signal samples to the radio data frame.

26. The method of claim 17, further comprising:
- at the RE, compressing the signal samples output from the DDC to form compressed signal samples, wherein said mapping the data packets and the signal samples maps the compressed signal samples of the corresponding antenna-carrier to the second set of containers, wherein at the gateway, said retrieving the data bits and the signal samples from the mixed-data frame retrieves the compressed signal samples from the second set of containers, wherein said mapping the signal samples into one or more radio data frames maps the compressed signal samples to the radio data frame.

27. The method of claim 17, wherein the DAS includes a first RE coupled to the gateway by the data transfer interface and a second RE coupled to the first RE by a second data transfer interface, the first RE and the second RE each performing said step of receiving the data packets from a corresponding LAN segment to form a first data set and a second data set, respectively, wherein a first signal samples set is produced by a first DDC at the first RE and a second signal samples set is produced by a second DDC at the second RE, the second RE applying said mapping to the second data set and the second signal samples set to form a first mixed-data frame having said first set of containers for the second data set and said second set of containers for the second signal samples set, the method further comprising:

- at the second RE, transmitting the first mixed-data frame over the second data transfer interface to the first RE;
- receiving the first mixed-data frame at the first RE;
- retrieving the second data set and the second signal samples set from the first mixed-data frame;
- selecting the data bits destined for the gateway to a third data set; and
- mapping the first data set, the third data set, the first signal samples set and the second signal samples set to respective sets of containers in a second mixed-data frame, wherein said transmitting the mixed-data frame transmits the second mixed-data frame from the first RE to the gateway via the data transfer interface.

28. The method of claim 27, further comprising:

- at the second RE, compressing the second signal samples set output from the second DDC to form a second compressed signal samples set, wherein said mapping the data packets and the signal samples maps the second compressed signal samples set to the second set of containers in the first mixed-data frame, wherein at the first RE, said retrieving the second data set and the second signal samples set from the first mixed-data frame retrieves the second compressed signal samples set from the second set of containers; and
- at the first RE, compressing the first signal samples set output from the first DDC to form a first compressed signal samples set, wherein said mapping the first data set, the third data set, the first signal samples set and the second signal samples set maps the first compressed signal samples set and the second compressed signal samples set to the respective sets of containers, wherein at the gateway, said retrieving the data bits and the signal samples retrieves the first compressed signal samples set and the second compressed signal samples set from the respective sets of containers.

29. The method of claim 28, further comprising at the gateway:

- decompressing the first compressed signal samples set and the second compressed signal samples set to form respective sets of decompressed signal samples, wherein said mapping the signal samples into one or more radio data frames maps the respective sets of decompressed signal samples to the radio data frame.

30. The method of claim 28, wherein at the gateway said mapping the signal samples maps the first compressed signal samples set and the second compressed signal samples set to the radio data frame.

31. The method of claim 17, wherein the control information portion of the mixed-data frame includes an assignment information to provide the first set of containers for the data bits and the second set of containers for the signal samples of the corresponding antenna-carrier.

32. The method of claim 17, wherein the radio data interface protocol is in accordance with a Common Public Radio Interface (CPRI).

33. The method of claim 17, wherein said transmitting includes applying a 4-dimensional, 5-level pulse amplitude modulation (4D-PAM5) to the mixed-data frame.

34. In a distributed antenna system (DAS) that includes at least one radio equipment (RE), an apparatus for data distribution in the DAS and a local area network (LAN) in proximity with the DAS, wherein the data include signal samples from a radio equipment controller (REC) and data packets from a switch, wherein the data packets are destined for one or more LAN segments of the LAN, wherein each data packet contains a plurality of data bits organized in accordance with a LAN protocol used by the LAN, the data packet including an address information associated with a destination device of a corresponding LAN segment, wherein each signal sample corresponds to an antenna-carrier, each RE including a digital upconverter (DUC) and a digital to analog converter (DAC) to process the signal samples of one or more antenna-carriers for transmission via an antenna, the apparatus comprising:

- a gateway, including one or more gateway ports coupled to receive one or more streams of the data packets from the switch, wherein the stream of the data packets destined for the corresponding LAN segment are received over a given gateway port, wherein the corresponding LAN segment is coupled to communicate with a corresponding RE, the gateway coupled to receive the signal samples from the REC via a serial data link, wherein the signal samples are organized into one or more radio data frames having a frame structure in accordance with a radio data interface protocol, the frame structure including a user data portion and a control information portion, the user data portion including a plurality of containers, wherein the plurality of containers are assigned to corresponding antenna-carriers of the corresponding RE, wherein a given container includes one or more of the signal samples of the corresponding antenna-carrier, the gateway coupled to communicate via a data transfer interface for each RE, the gateway comprising:
- one or more mixed-data framers, wherein each mixed-data framer maps the data packets and the signal samples for the corresponding RE into one or more mixed-data frames, the mixed-data frames having the frame structure in accordance with the radio data interface protocol, wherein a first set of containers in a user data portion of the mixed-data frame contains the data bits of the data packets for the corresponding LAN segment and a second set of containers in the user data portion of the mixed-data frame contains the signal samples of the corresponding antenna-carrier; and
- the data transfer interface coupled to the mixed-data framer for transmitting the mixed-data frame to the corresponding RE; the apparatus further comprising at the RE:
- a mixed-data deframer coupled to receive the mixed-data frame at the corresponding RE from the data transfer interface, the mixed-data deframer retrieving the data bits and the signal samples from the mixed-data frame, wherein the data bits for the corresponding LAN segment are retrieved from the first set of containers in the mixed-data frame and the signal samples of the corresponding antenna-carrier are retrieved from the second set of containers in the mixed-data frame, the mixed-data deframer providing the signal samples to the DUC; and
- formatting logic receiving the data bits from the mixed-data deframer and forming one or more reconstructed data packets in accordance with the LAN protocol for transmission to the corresponding LAN segment.

35. The apparatus of claim 34, wherein the mixed-data framer further comprises:
  data mapping logic to map the data bits of the data packets to the first set of containers assigned to the corresponding LAN segment;
  signal data mapping logic to map the signal samples to the second set of containers assigned to the corresponding antenna-carrier; and
  a multiplexer to interleave the containers of the first set and containers of the second set to form a sequence of multiplexed containers for the user data portion of the mixed-data frame.

36. The apparatus of claim 35, wherein said mixed-data deframer further comprises:
  a demultiplexer receiving the mixed-data frame and de-interleaving the sequence of multiplexed containers to separate the first set of containers and the second set of containers, wherein the demultiplexer provides the data bits from the first set of containers to the formatting logic and the signal samples from the second set of containers to the DUC.

37. The apparatus of claim 34, wherein the gateway further comprises:
  a preprocessor that receives the data packet from the gateway port, the preprocessor extracting the data bits from the data packet and providing the data bits to the mixed-data framer for the corresponding RE; and
  a deframer that receives the radio data frame from the serial data link, the deframer extracting the signal samples from the set of containers for the corresponding antenna-carrier and providing the signal samples to the mixed-data framer for the corresponding RE.

38. The apparatus of claim 34, wherein a plurality of LAN segments is coupled to communicate with the corresponding RE, wherein the first set of containers in the mixed-data frame comprises a first plurality of subsets, the mixed-data framer further comprising:
  logic to assign each subset of the first plurality of subsets to a corresponding one of the plurality of LAN segments; and
  data mapping logic to map the data bits of the data packets destined for the corresponding LAN segment to a corresponding subset in the first plurality of subsets.

39. The apparatus of claim 34, wherein a plurality of LAN segments is coupled to communicate with the corresponding RE, the mixed-data framer further comprising:
  logic to assign the first set of containers to the corresponding RE; and
  data mapping logic to map the data of the data packets destined for the plurality of LAN segments to the first set of containers.

40. The apparatus of claim 39, wherein said formatting logic further comprises:
  a RE data buffer receiving the data bits from the mixed-data deframer, wherein the RE data buffer stores the data bits for the plurality LAN segments coupled to communicate with the corresponding RE;
  framing logic to map the data bits from the RE data buffer to the reconstructed data packet, wherein the reconstructed data packet includes the address information in accordance with the LAN protocol; and
  switching logic to direct the reconstructed data packet to a corresponding one of the LAN segments based on the address information.

41. The apparatus of claim 34, wherein the signal samples of a plurality of antenna-carriers are destined for the corresponding RE, wherein the second set of containers in the mixed-data frame comprises a second plurality of subsets, the mixed-data framer further comprising:
  logic to assign each subset of the second plurality of subsets to a corresponding one of the plurality of antenna-carriers; and
  signal data mapping logic to map the signal samples of the corresponding antenna-carrier to a corresponding subset in the second plurality of subsets.

42. The apparatus of claim 34, wherein the gateway further comprises a compressor applied to the signal samples to form compressed signal samples, wherein said mixed-data framer maps the compressed signal samples of the corresponding antenna-carrier to the second set of containers, wherein at the RE, the mixed-data deframer retrieves the compressed signal samples from the second set of containers, the apparatus further comprising at the RE:
  a decompressor applied to the compressed signal samples received from the mixed-data deframer to form decompressed signal samples, the decompressor providing the decompressed signal samples to the DUC.

43. The apparatus of claim 34, wherein the signal samples transmitted from the REC are compressed signal samples in the radio data frame, wherein at the gateway the mixed-data framer maps the compressed signal samples of the corresponding antenna-carrier to the second set of containers, wherein at the RE, the mixed-data deframer retrieves the compressed signal samples from the second set of containers, the apparatus further comprising at the RE:
  a decompressor applied to the compressed samples received from the mixed-data deframer to form decompressed signal samples, the decompressor providing the decompressed signal samples to the DUC.

44. The apparatus of claim 34, wherein the DAS includes a first RE coupled to the gateway by the data transfer interface and a second RE coupled to the first RE by a second data transfer interface, wherein at the gateway the mixed-data framer produces the mixed-data frame further including a third set of containers and a fourth set of containers, wherein the third set of containers contains the data bits destined for a second LAN segment in communication with the second RE and the fourth set of containers contains the signal samples destined for the second RE, wherein at the first RE the mixed-data deframer retrieves the data bits from the first set and the third set of containers in the mixed-data frame and the signal samples from the second set and the fourth set of containers in the mixed-data frame, the apparatus further comprising:
  at the first RE, a second mixed-data framer coupled to the mixed-data deframer to map the data bits retrieved from the third set and the signal samples retrieved from the fourth set to respective sets of containers in a second mixed-data frame;
  the second data transfer interface coupled to the second mixed-data framer for transmitting the second mixed-data frame to the second RE;
  at the second RE, a second mixed-data deframer coupled to receive the second mixed-data frame from the second data transfer interface, the second mixed-data deframer retrieving the data bits and the signal samples from the respective sets of containers in the second mixed-data frame, the second mixed-data deframer providing the signal samples to a second DUC of the second RE; and
  second formatting logic receiving the data bits from the second mixed-data deframer and forming corresponding reconstructed data packets for transmission to the second LAN segment.

45. The apparatus of claim 44, wherein the gateway further comprises a compressor applied to the signal samples destined for the first RE and the signal samples destined for the second RE to form compressed signal samples, wherein the mixed-data framer maps the compressed signal samples to the second set and the fourth set of containers, wherein at the first RE the mixed-data deframer retrieves the compressed signal samples from the second set and the fourth set, wherein the second mixed-data framer maps the compressed signal samples retrieved from the fourth set to the respective set of containers in the second mixed-data frame, wherein at the second RE, the second mixed-data deframer retrieves the compressed signal samples from the respective set of containers in the second mixed-data frame, the apparatus further comprising at the second RE:
  a decompressor applied to the compressed samples received from the second mixed-data deframer to form decompressed signal samples, the decompressor providing the decompressed signal samples to the second DUC.

46. The apparatus of claim 44, wherein the signal samples transmitted from the REC in the radio data frame are compressed signal samples destined for the first RE and compressed signal samples destined for the second RE, wherein at the gateway the mixed-data framer maps the compressed signal samples to the second set and the fourth set of containers, wherein at the first RE the mixed-data deframer retrieves the compressed signal samples from the second set and the fourth set, wherein the second mixed-data framer maps the compressed signal samples retrieved from the fourth set to the respective set of containers in the second mixed-data frame, wherein at the second RE, the second mixed-data deframer retrieves the compressed signal samples from the respective set of containers, the apparatus further comprising at the second RE:
  a decompressor applied to the compressed samples received from the second mixed-data deframer to form decompressed signal samples, the decompressor providing the decompressed signal samples to the second DUC.

47. The apparatus of claim 34, wherein a control information portion of the mixed-data frame includes an assignment information to provide the first set of containers for the data bits and the second set of containers for the signal samples of the corresponding antenna-carrier.

48. The apparatus of claim 34, wherein the radio data interface protocol is in accordance with a Common Public Radio Interface (CPRI).

49. The apparatus of claim 34, wherein the data transfer interface further comprises an encoder that applies a 4-dimensional, 5-level pulse amplitude modulation (4D-PAM5) to the mixed-data frame.

50. In a distributed antenna system (DAS) that includes at least one radio equipment (RE), an apparatus for data distribution in the DAS and a local area network (LAN) in proximity with the DAS, wherein the data include signal samples and data packets, wherein the data packets are transmitted from one or more LAN segments of the LAN, wherein the each data packet contains a plurality of data bits organized in accordance with a LAN protocol used by the LAN, the data packet including an address information associated with a source device of a corresponding LAN segment, wherein the RE is coupled to receive an analog signal from an antenna, the RE including an analog to digital converter (ADC) applied to the analog signal and a digital downconverter (DDC) to produce the signal samples of one or more antenna-carriers, the apparatus comprising:
  a mixed-data framer receiving the signal samples output from the DDC of a corresponding RE and the data bits of the data packets from the corresponding LAN segment, wherein the corresponding LAN segment is coupled to communicate with the corresponding RE, the mixed-data framer mapping the data bits and the signal samples to one or more mixed-data frames, the mixed-data frames having a frame structure in accordance with a radio data interface protocol, the frame structure including a user data portion and a control information portion, the user data portion including a plurality of containers, wherein a first set of containers in the mixed-data frame contain the data bits of the data packets from the corresponding LAN segment and a second set of containers in the mixed-data frame contain the signal samples of a corresponding antenna-carrier;
  a gateway coupled to receive the mixed-data frame from the corresponding RE via a data transfer interface; the gateway comprising:
  a mixed-data deframer retrieving the data bits and the signal samples from the mixed-data frame, wherein the data bits from the corresponding LAN segment are retrieved from the first set of containers in the mixed-data frame and the signal samples of the corresponding antenna-carrier are retrieved from the second set of containers in the mixed-data frame;
  formatting logic coupled to receive the data bits from the mixed-data deframer and formatting the data bits into one or more reconstructed data packets in accordance with the LAN protocol for transmission to a switch; and
  a radio data framer coupled to receive the signal samples from the mixed-data deframer and mapping the signal samples into one or more radio data frames in accordance with the radio data interface protocol for transfer to a radio equipment controller (REC) via a serial data link.

51. The apparatus of claim 50, wherein the mixed-data framer further comprises:
  data mapping logic to map the data bits to the first set of containers assigned to the corresponding LAN segment;
  signal data mapping logic to map the signal samples to the second set of containers assigned to the corresponding antenna-carrier; and
  a multiplexer to interleave the containers of the first set and containers of the second set to form a sequence of multiplexed containers for the user data portion of the mixed-data frame.

52. The apparatus of claim 51, wherein the mixed-data deframer further comprises:
  a demultiplexer receiving the mixed-data frame and de-interleaving the sequence of multiplexed containers to separate the first set of containers and the second set of containers, wherein the demultiplexer provides the data bits from the first set of containers to the formatting logic and the signal samples from the second set of containers to the radio data framer.

53. The apparatus of claim 50, further comprising at the RE:
  a preprocessor that receives the data packets from the corresponding LAN segment, the preprocessor extracting the data bits from the data packets and providing the data bits to the mixed-data framer.

54. The apparatus of claim 50, wherein a plurality of LAN segments is coupled to communicate with the corresponding RE, wherein the first set of containers in the mixed-data frame comprises a first plurality of subsets, the mixed-data framer further comprising:

logic to assign each subset of the first plurality of subsets to a corresponding one of the plurality of LAN segments; and data mapping logic to map the data bits of the data packets from the corresponding LAN segment to a corresponding subset in the first plurality of subsets.

55. The apparatus of claim 50, wherein a plurality of LAN segments is coupled to communicate with the corresponding RE, the mixed-data framer further comprising:

logic to assign the first set of containers to the corresponding RE; and data mapping logic to map the data bits of the data packets from the plurality of LAN segments to the first set of containers.

56. The apparatus of claim 55, wherein said formatting logic further comprises:

an data buffer receiving the data bits from the mixed-data deframer, wherein the data buffer stores the data bits for the plurality LAN segments coupled to communicate with the corresponding RE;

framing logic to map the data bits from the data buffer to the reconstructed data packet, wherein the reconstructed data packet includes the address information in accordance with the LAN protocol; and switching logic to direct the reconstructed data packet to a corresponding port of the gateway based on the address information.

57. The apparatus of claim 50, wherein a plurality of antenna-carriers is processed by the corresponding RE, wherein the second set of containers in the mixed-data frame comprises a second plurality of subsets, the mixed-data framer further comprising:

logic to assign each subset of the second plurality of subsets to a corresponding one of the plurality of antenna-carriers; and signal data mapping logic to map the signal samples of the corresponding antenna-carrier to a corresponding subset in the second plurality of subsets.

58. The apparatus of claim 50, further comprising:

at the RE, a compressor applied to the signal samples output from the DDC to form compressed signal samples, wherein said mixed-data framer maps the compressed signal samples of the corresponding antenna-carrier to the second set of containers, wherein at the gateway, the mixed-data deframer retrieves the compressed signal samples from the second set of containers; and the gateway further comprises:

a decompressor applied to the compressed signal samples received from the mixed-data deframer to form decompressed signal samples, the decompressor providing the decompressed signal samples to the radio data framer.

59. The apparatus of claim 50, further comprising at the RE:

a compressor applied to the signal samples output from the DDC to form compressed signal samples, wherein said mixed-data framer maps the compressed signal samples of the corresponding antenna-carrier to the second set of containers, wherein at the gateway, the mixed-data deframer retrieves the compressed signal samples from the second set of containers in the mixed-data frame and the radio data framer maps the compressed signal samples into the radio data frame.

60. The apparatus of claim 50, wherein the DAS includes a first RE coupled to the gateway by the data transfer interface and a second RE coupled to the first RE by a second data transfer interface, the first RE receives a first data set from a first LAN segment and the second RE receives a second data set from a second LAN segment, wherein a first signal samples set is produced by a first DDC at the first RE and a second signal samples set is produced by a second DDC at the second RE, the second RE applying said mixed-data framer to the second data set and the second signal samples set to form a first mixed-data frame having said first set of containers for the second data set and said second set of containers for the second signal samples set, wherein the first mixed-data frame is transmitted to the first RE via the second data transfer interface, the apparatus further comprising at the first RE:

an uplink mixed-data deframer coupled to receive the first mixed-data frame, the uplink mixed-data deframer retrieving the second data set from the first set of containers and the second signal samples set from the second set of containers;

selecting logic to select the data bits destined for the gateway from the second data set to form a third data set; and an uplink mixed-data framer coupled to receive the first data set from the first LAN segment, the third data set from the selecting logic, the first signal samples set from the first DDC and the second signal samples set from the uplink mixed-data deframer, wherein the uplink mixed-data framer maps the first data set, the third data set, the first signal samples set and the second signal samples set to respective sets of containers in a second mixed-data frame, wherein the second mixed-data frame is transmitted from the first RE to the gateway via the data transfer interface, wherein the gateway applies the mixed-data deframer to the second mixed-data frame.

61. The apparatus of claim 60, further comprising:

at the second RE, a second compressor applied to the second signal samples set output from the second DDC to form a second compressed signal samples set, wherein said mixed-data framer maps the second compressed signal samples set to the second set of containers in the first mixed-data frame, wherein at the first RE, said uplink mixed-data deframer retrieves the second compressed signal samples set from the second set of containers; and at the first RE, a first compressor applied to the first signal samples set output from the first DDC to form a first compressed signal samples set, wherein said uplink mixed-data framer maps the first compressed signal samples set and the second compressed signal samples set to the respective sets of containers, wherein at the gateway, the mixed-data deframer retrieves the first compressed signal samples set and the second compressed signal samples set from the respective sets of containers.

62. The apparatus of claim 61, wherein the gateway further comprises:

a decompressor applied to the first compressed signal samples set and the second compressed signal samples set to form respective sets of decompressed signal samples, the decompressor providing the respective sets of decompressed signal samples to the radio data framer, wherein the radio data framer maps the respective sets of decompressed signal samples into the radio data frame.

63. The apparatus of claim 61, wherein at the gateway the radio data framer receives the first compressed signal samples set and the second compressed signal samples set from the mixed-data deframer and maps the first compressed signal samples set and the second compressed signal samples set to the radio data frame.

64. The apparatus of claim 50, wherein the control information portion of the mixed-data frame includes an assignment information to provide the first set of containers for the data bits and the second set of containers for the signal samples of the corresponding antenna-carrier.

65. The apparatus of claim 50, wherein the radio data interface protocol is in accordance with a Common Public Radio Interface (CPRI).

66. The apparatus of claim 50, wherein the data transfer interface further comprises an encoder that applies a 4-dimensional, 5-level pulse amplitude modulation (4D-PAM5) to the mixed-data frame.

* * * * *